(12) United States Patent  (10) Patent No.: US 9,319,184 B2
Jain et al.  (45) Date of Patent: *Apr. 19, 2016

(54) MULTIPLE WIRELESS COMMUNICATION DEVICE ACKNOWLEDGEMENTS

(75) Inventors: Vikrant Jain, Farnborough (GB); Mungal Singh Dhanda, Slough (GB); Philip J. Children, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 422 days.

This patent is subject to a terminal disclaimer.

(21) Appl. No.: 13/363,217

(22) Filed: Jan. 31, 2012

(65) Prior Publication Data

US 2012/0195250 A1    Aug. 2, 2012

Related U.S. Application Data

(60) Provisional application No. 61/507,055, filed on Jul. 12, 2011, provisional application No. 61/438,639, filed on Feb. 1, 2011, provisional application No. 61/510,278, filed on Jul. 21, 2011.

(51) Int. Cl.
*H04L 1/16* (2006.01)
*H04L 1/18* (2006.01)
*H04L 1/00* (2006.01)

(52) U.S. Cl.
CPC ............ *H04L 1/1614* (2013.01); *H04L 1/1628* (2013.01); *H04L 1/1854* (2013.01); *H04L 1/1685* (2013.01); *H04L 2001/0093* (2013.01)

(58) Field of Classification Search
None
See application file for complete search history.

(56) References Cited

U.S. PATENT DOCUMENTS 6,718,179 B1    4/2004  Forssell et al.
7,948,991 B1 *  5/2011  Hart et al. .................. 370/395.4
(Continued)

FOREIGN PATENT DOCUMENTS

EP        2437428 A1    4/2012
JP     2000069555 A     3/2000
(Continued)

OTHER PUBLICATIONS

"3rd Generation Partnership Project; Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol (Release 10)", 3GPP Standard; 3GPP TS 44.060, 3rd Generation Partnership Project (3GPP), Mobile Competence Centre ; 650, Route Des Lucioles ; F-06921 Sophia-Antipolis Cedex; France, No. V10.3.0, Dec. 20, 2010, pp. 1-623, XP050462334, [retrieved on Dec. 20, 2010] cited in the application Section 10.4.5.

(Continued)

*Primary Examiner* — Christine Duong
(74) *Attorney, Agent, or Firm* — Larry J. Moskowitz

(57) ABSTRACT

A method for receiving acknowledgements from plural wireless communication devices is described. A first acknowledgement message addressed to the plural wireless communication devices is transmitted. The first acknowledgement message indicates for each wireless communication device a period within which that wireless communication device should transmit a device acknowledgement message. A device acknowledgement message is received from each of the plural wireless communication devices. The device acknowledgement message is transmitted within the period indicated for that wireless communication device to transmit its device acknowledgement message. Other aspects, embodiments, and features, are also claimed and discussed.

65 Claims, 22 Drawing Sheets

(56) References Cited

U.S. PATENT DOCUMENTS

| | | | |
|---|---|---|---|
| 2002/0105940 A1* | 8/2002 | Forssell et al. | 370/349 |
| 2003/0125051 A1* | 7/2003 | Leppisaari | 455/466 |
| 2004/0090948 A1* | 5/2004 | Forssell et al. | 370/349 |
| 2007/0189207 A1 | 8/2007 | Sammour et al. | |
| 2007/0249343 A1* | 10/2007 | Olsson et al. | 455/435.1 |
| 2007/0268870 A1 | 11/2007 | Buckley et al. | |
| 2009/0252100 A1* | 10/2009 | Sridhara et al. | 370/329 |
| 2010/0238910 A1 | 9/2010 | Conway et al. | |
| 2011/0090855 A1 | 4/2011 | Kim | |
| 2011/0096710 A1* | 4/2011 | Liu et al. | 370/312 |
| 2011/0158159 A1 | 6/2011 | Gong et al. | |
| 2011/0261742 A1 | 10/2011 | Wentink | |

FOREIGN PATENT DOCUMENTS

| | | |
|---|---|---|
| JP | 2002320275 A | 10/2002 |
| JP | 2004511984 A | 4/2004 |
| JP | 2010503250 A | 1/2010 |
| JP | 2012502551 A | 1/2012 |
| WO | WO-0232168 A1 | 4/2002 |
| WO | WO-2008029210 A2 | 3/2008 |
| WO | 2009012448 A2 | 1/2009 |
| WO | 2009157901 A1 | 12/2009 |
| WO | WO-2010030322 A2 | 3/2010 |
| WO | WO2011149318 A2 | 12/2011 |

OTHER PUBLICATIONS

International Search Report and Written Opinion—PCT/US2012/023500—ISA/EPO—Apr. 19, 2012.

Taiwan Search Report—TW101103288—TIPO—Nov. 13, 2014.

\* cited by examiner

MULTIPLE WIRELESS COMMUNICATION DEVICE ACKNOWLEDGEMENTS

RELATED APPLICATIONS & PRIORITY CLAIMS

This application is related to, claims the benefit of, and claims priority to: (a) U.S. Provisional Patent Application Ser. No. 61/507,055, filed Jul. 12, 2011, for "PLURAL WIRELESS COMMUNICATION DEVICE ACKNOWLEDGEMENTS;" (b) U.S. Provisional Patent Application Ser. No. 61/438,639, filed Feb. 1, 2011, for "SENDING ACKNOWLEDGEMENT TO MULTIPLE MOBILE STATIONS WITHIN ONE MESSAGE; and (c) U.S. Provisional Patent Application Ser. No. 61/510,278, filed 21 Jul. 2011, for Wireless Terminal Wait State Override. All of said applications are incorporated herein by reference as if fully set forth below in there entireties and for all purposes.

TECHNICAL FIELD

The present disclosure relates generally to communication systems. More specifically, the present disclosure relates to systems and methods for multiple wireless communication device acknowledgements.

BACKGROUND

Wireless communication systems have become an important means by which many people worldwide have come to communicate. A wireless communication system may provide communication for a number of subscriber stations, each of which may be serviced by a base station.

The potential uses of subscriber stations have increased dramatically. For example, with the introduction of machine-to-machine (M2M) devices, a wireless link may be used to allow interaction with machines that have not traditionally been accessed wirelessly. This includes a myriad of different electronic devices, such as home electronics, lighting, heating, storage and automobiles. As the number of electronic devices that are accessed wirelessly (either for control or to obtain usage data) increases, the number of subscriber stations communicating in a geographic area may also increase. Such an increase may lead to overloading of a base station. Benefits may be realized by preventing subscriber stations from overloading a base station.

SUMMARY

A method for receiving acknowledgements from plural wireless communication devices is described. A first acknowledgement message addressed to the plural wireless communication devices is transmitted. The first acknowledgement message indicates for each wireless communication device a period within which that wireless communication device should transmit a device acknowledgement message. A device acknowledgement message is received from each of the plural wireless communication devices. The device acknowledgement message was transmitted within the period indicated for that wireless communication device to transmit its device acknowledgement message.

The first acknowledgement message may be generated in the form of a single acknowledgement message that addresses each of the plural wireless communication devices. Transmitting the first acknowledgement message may include transmitting the single acknowledgement message for receipt by the plural wireless communication devices. The single acknowledgement message may include a list of addresses of the plural wireless communication devices addressed by the single acknowledgement message. A relative position within the list of the addresses may be indicative of the period within which that wireless communication device should transmit its device acknowledgement message.

An address of each wireless communication device in the list of addresses may be a Temporary Flow Identifier (TFI). The first acknowledgement message may include Ack/Nack information for each addressed wireless communication device. The first acknowledgment message may indicate that the device acknowledgement messages are to be transmitted by the plural wireless communication devices.

The first acknowledgement message may also indicate at least one acknowledgement group. Each acknowledgement group may include a group of wireless communication devices allocated a common time interval within which the wireless communication devices of the group are to transmit their device acknowledgement messages. The common time interval may be a relative reserved block period that includes one or more frames. The first acknowledgement message may indicate a first time interval in which the first acknowledgement message was transmitted. The first acknowledgement message may also indicate a base relative reserved block period that is associated with all of the plural wireless communication devices and indicates a number of frames in addition to the one or more frames.

An apparatus for receiving acknowledgements from plural wireless communication devices is also described. The apparatus includes means for transmitting a first acknowledgement message addressed to the plural wireless communication devices. The first acknowledgement message indicates for each wireless communication device a period within which that wireless communication device should transmit a device acknowledgement message. The apparatus also includes means for receiving from each of the plural wireless communication devices a device acknowledgement message transmitted within the period indicated for that wireless communication device to transmit its device acknowledgement message.

A computer-program product for receiving acknowledgements from plural wireless communication devices is described. The computer-program product includes a non-transitory computer-readable medium having instructions thereon. The instructions include code for causing a base station to transmit a first acknowledgement message addressed to the plural wireless communication devices. The first acknowledgement message indicates for each wireless communication device a period within which that wireless communication device should transmit a device acknowledgement message. The instructions also include code for causing the base station to receive from each of the plural wireless communication devices a device acknowledgement message transmitted within the period indicated for that wireless communication device to transmit its device acknowledgement message.

A method for transmitting a device acknowledgement from a wireless communication device is described. A first acknowledgement message is received from a base station addressed to plural wireless communication devices. A period associated with the wireless communication device is determined from the first acknowledgment message. A device acknowledgement message is transmitted within the period.

Determining the period may include determining a portion of the first acknowledgement message that is directed to the wireless communication device and not to others of the plural wireless communication devices. The first acknowledgement message may include a list of addresses of the plural wireless communication devices addressed by the first acknowledgement message. Determining the period may include determining a relative position within the list of addresses of an address of the wireless communication device. The period may be determined based on the relative position.

An address of the wireless communication device in the list of addresses may be a Temporary Flow Identifier (TFI). The first acknowledgement message may include Ack/Nack information for each of the plural wireless communication devices. It may be determined from the first acknowledgment message that the device acknowledgement message is to be transmitted within the period.

The first acknowledgement message may indicate at least one acknowledgement group that includes a group of wireless communication devices allocated a common time interval within which to transmit their device acknowledgement messages. A membership of a wireless communication device in an acknowledgement group may be determined on the basis of the common time interval allocated to the wireless communication device. Transmitting the device acknowledgement message may include transmitting the device acknowledgement message within the common time interval allocated to the wireless communication device.

The common time interval may be a relative reserved block period that includes one or more frames. Determining the period may include determining the period as at least one frame within the common time interval allocated to the wireless communication device based on a relative position of an address of the wireless communication device within the list of addresses relative to positions of addresses of other wireless communication devices that are members of the acknowledgement group of which the wireless communication device is a member.

The first acknowledgement message may indicate a first time interval during which the first acknowledgement message was transmitted and a second time interval associated with all of the plural devices. Determining the period may be based on the first time interval and the second time interval. The first time interval may be a first frame of a radio block that includes the first acknowledgement message. The second time interval may be a base relative reserved block period. Determining the period may include determining a number of frames used for a device acknowledgement message by one or more other wireless communication devices addressed by the first acknowledgement message.

A wireless communication device for transmitting a device acknowledgement is described. The wireless communication device includes means for receiving a first acknowledgement message from a base station addressed to plural wireless communication devices. The wireless communication device also includes means for determining a period associated with the wireless communication device from the first acknowledgment message. The wireless communication device further includes means for transmitting a device acknowledgement message within the period.

A computer-program product for transmitting acknowledgements from a wireless communication device is also described. The computer-program product includes a non-transitory computer-readable medium having instructions thereon. The instructions include code for causing the wireless communication device to receive a first acknowledgement message from a base station addressed to plural wireless communication devices. The instructions also include code for causing the wireless communication device to determine a period associated with the wireless communication device from the first acknowledgment message. The instructions further include code for causing the wireless communication device to transmit a device acknowledgement message within the period.

A method for transmitting acknowledgements to multiple wireless communication devices is described. A single acknowledgement message is generated. The single acknowledgement message allows a base station to address multiple wireless communication devices. The single acknowledgement message is sent to the multiple wireless communication devices.

Radio link control messages may be received from the multiple wireless communication devices. The acknowledgement message may include a Temporary Flow Identity for each wireless communication device. The acknowledgement message may also include a relative reserved block period for an addressed wireless communication device. The acknowledgement message may be a packet uplink ACK/NACK.

A presence of relative reserved block period information within the acknowledgement message may imply that the wireless communication device addressed by a corresponding Temporary Flow Identity is polled for packet control acknowledgement. An ES/P field in a header of the acknowledgement message may not used. The acknowledgement message may include a variable length acknowledgement bit map for each wireless communication device that is not receiving a final acknowledgement.

The acknowledgement message may include a combination of final acknowledgements for some wireless communication devices and variable length acknowledgement bit maps for other wireless communication devices. The number of relative reserved block period bits may be extended beyond two bits. The method may be performed by a base station. It may further be determined whether a received radio link control message for each wireless communication device includes all radio link control data blocks sent by the wireless communication device.

A method for receiving an acknowledgement by a wireless communication device is also described. An acknowledgement message is received from a base station. A portion of the acknowledgement message that corresponds to the wireless communication device is determined. It is determined whether the portion of the acknowledgement message that corresponds to the wireless communication device is a final acknowledgement or a variable length acknowledgement bit map.

The portion of the acknowledgement message that corresponds to the wireless communication device may be a final acknowledgement. The wireless communication device may be aware that the base station has successfully received radio link control data blocks sent by the wireless communication device to the base station.

The portion of the acknowledgement message that corresponds to the wireless communication device may be a variable length acknowledgement bit map. One or more radio link control data blocks to resend to the base station may be determined. The determined one or more radio link control data blocks may be sent to the base station. The acknowledgement message may allow the base station to address multiple wireless communication devices. The acknowledgement message may include a Temporary Flow Identity for each wireless communication device. The acknowledgement message may include a relative reserved block period for a wireless communication device addressed by the base station. The acknowledgement message may be a packet uplink ACK/NACK.

An apparatus for transmitting acknowledgements to multiple wireless communication devices is described. The apparatus includes a processor, memory in electronic communication with the processor and instructions stored in the memory. The instructions are executable by the processor to generate a single acknowledgement message. The single acknowledgement message allows a base station to address multiple wireless communication devices. The instructions are also executable by the processor to send the single acknowledgement message to the multiple wireless communication devices.

An apparatus for receiving acknowledgements from a base station is also described. The apparatus includes a processor, memory in electronic communication with the processor and instructions stored in the memory. The instructions are executable by the processor to receive an acknowledgement message from the base station. The instructions are also executable by the processor to determine a portion of the acknowledgement message that corresponds to the apparatus.

A wireless device for transmitting acknowledgements to multiple wireless communication devices is described. The wireless device includes means for generating a single acknowledgement message. The single acknowledgement message allows a base station to address multiple wireless communication devices. The wireless device also includes means for sending the single acknowledgement message to the multiple wireless communication devices.

A wireless device for receiving acknowledgements from a base station is also described. The wireless device includes means for receiving an acknowledgement message from the base station. The wireless device also includes means for determining a portion of the acknowledgement message that corresponds to the wireless device.

A computer-program product for transmitting acknowledgements to multiple wireless communication devices is described. The computer-program product includes a non-transitory computer-readable medium having instructions thereon. The instructions include code for causing a base station to generate a single acknowledgement message that allows a base station to address multiple wireless communication devices. The instructions also include code for causing the base station to send the single acknowledgement message to the multiple wireless communication devices.

A computer-program product for receiving acknowledgements from a base station is described. The computer-program product includes a non-transitory computer-readable medium having instructions thereon. The instructions include code for causing a wireless communication device to receive an acknowledgement message from the base station. The instructions also include code for causing the wireless communication device to determine a portion of the acknowledgement message that corresponds to the wireless communication device.

DETAILED DESCRIPTION

More and more people are using wireless communication devices, such as, for example, mobile phones, not only for voice but also for data communications. Telecommunications networks are being placed under increasing strain, both due to increasing bandwidth requirements of smartphones and mobile computers, and the increasing numbers devices and programs that seek access to the networks. For example, many applications running on smartphones periodically access the network to check for updates. While each access itself only consumes a relatively small amount of bandwidth, large numbers devices running lots of these applications can place a significant load on networks, and signaling and control channels in particular. The increasing prevalence of machine type communication (MTC) devices similarly increases the demands placed upon network resources.

Figure 1:
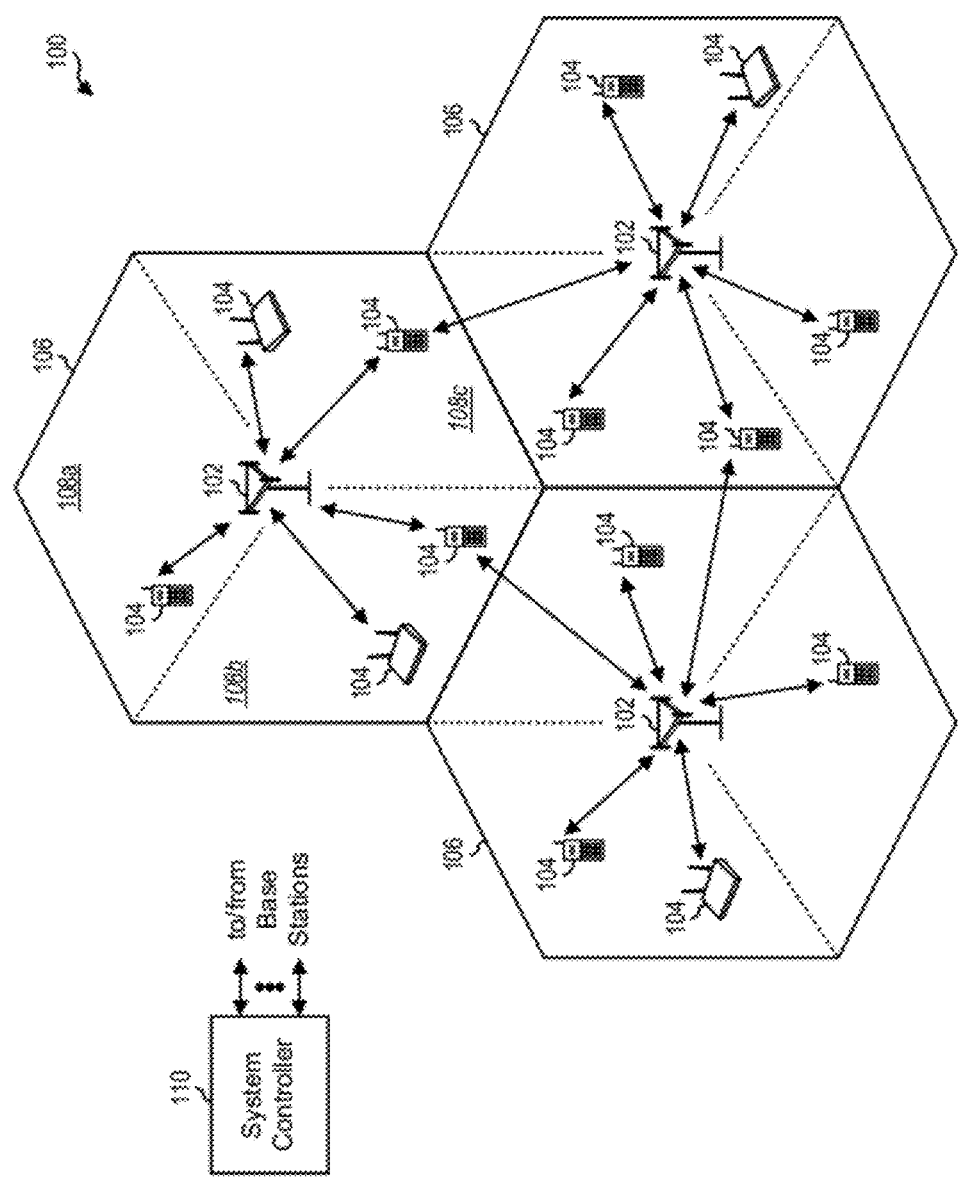
FIG. 1 shows an example of a wireless communication system in which the methods and apparatus disclosed herein may be utilized.

FIG. 1 shows an example of a wireless communication system 100 in which the systems and methods disclosed herein may be utilized. The wireless communication system 100 includes multiple base stations (BS) 102 and multiple wireless communication devices 104. Each base station 102 provides communication coverage for a particular geographic area 106. The term "cell" can refer to a base station 102 and/or its coverage area 106 depending on the context in which the term is used.

As used herein, the term "wireless communication device" refers to an electronic device that may be used for voice and/or data communication over a wireless communication system. Examples of wireless communication devices 104 include cellular phones, personal digital assistants (PDAs), handheld devices, wireless modems, laptop computers, personal computers, machine type communication (MTC) devices, machine-to-machine (M2M) devices and sensor devices (including, for example, so-called "smart-meters," alarms and health monitoring devices). A wireless communication device 104 may alternatively be referred to as an access terminal, a mobile terminal, a mobile station, a remote station, a user terminal, a terminal, a subscriber unit, a subscriber station, a mobile device, a wireless device, user equipment (UE), an MTC device or an M2M device, or some other similar terminology. Although MTC device is used extensively below to illustrate the gains that may be achieved in MTC devices, gains may also be achieved for other wireless communication devices 104 as well. The term "base station" refers to a wireless communication station that is installed at a fixed location and used to communicate with wireless communication devices 104. A base station 102 may alternatively be referred to as an access point (including nano-, pico- and femto-cells), a Node B, an evolved Node B, a Home Node B or some other similar terminology.

To improve system capacity, a base station coverage area 106 may be partitioned into plural smaller areas, e.g., three smaller areas 108a, 108b and 108c. Each smaller area 108a, 108b, 108c may be served by a respective base transceiver station (BTS). The term "sector" can refer to a BTS and/or its coverage area 108 depending on the context in which the term is used. For a sectorized cell, the BTSs for all sectors of that cell are typically co-located within the base station 102 for the cell.

Wireless communication devices 104 are typically dispersed throughout the wireless communication system 100. A wireless communication device 104 may communicate with one or more base stations 102 on the downlink and/or uplink at any given moment. The downlink (or forward link) refers to the communication link from a base station 102 to a wireless communication device 104, and the uplink (or reverse link) refers to the communication link from a wireless communication device 104 to a base station 102. Uplink and downlink may refer to the communication link or to the carriers used for the communication link.

For a centralized architecture, a system controller 110 may couple to the base stations 102 and provide coordination and control for the base stations 102. The system controller 110 may be a single network entity or a collection of network entities. For a distributed architecture, base stations 102 may communicate with one another as needed.

Figure 2:
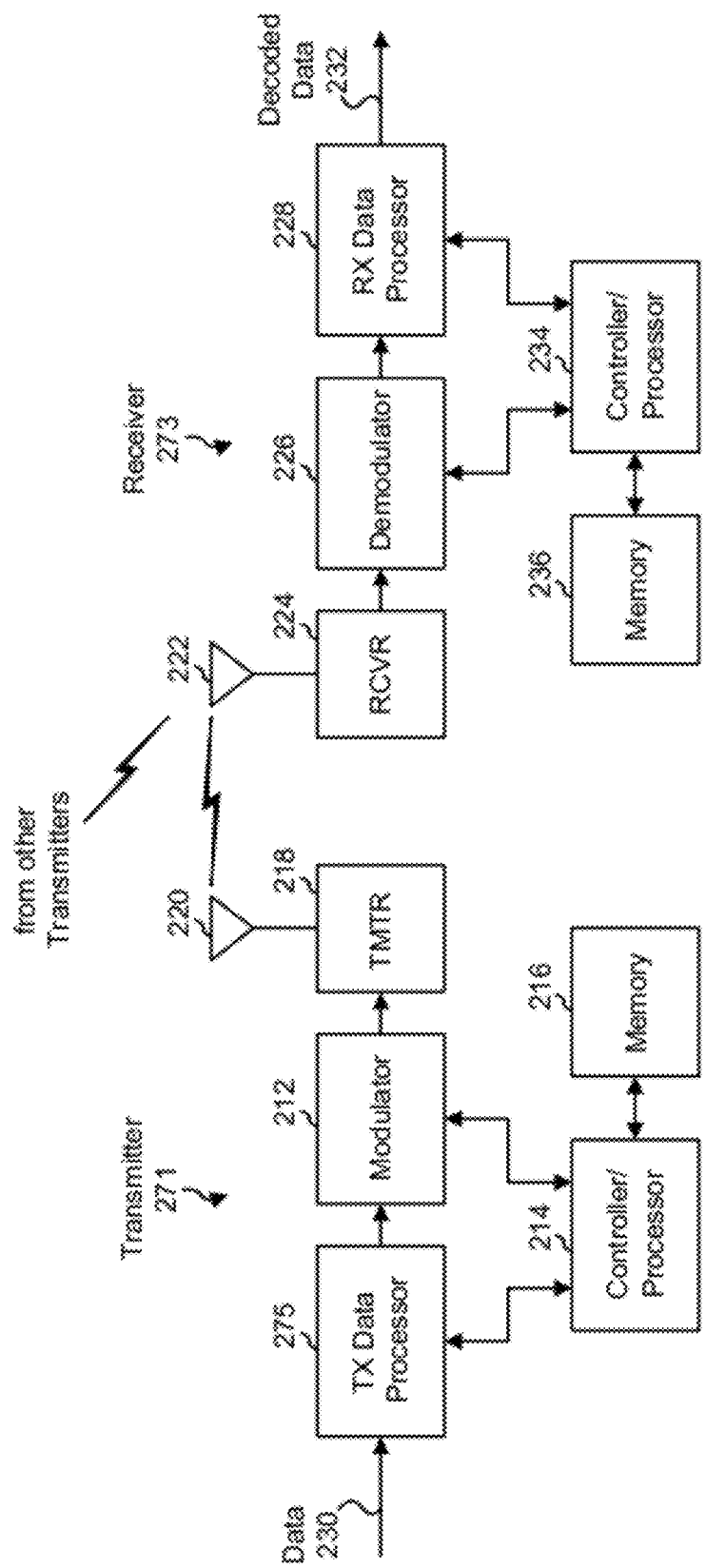
FIG. 2 shows a block diagram of a transmitter and a receiver in a wireless communication system.

FIG. 2 shows a block diagram of a transmitter 271 and a receiver 273 in a wireless communication system 100. For the downlink, the transmitter 271 may be part of a base station 102 and the receiver 273 may be part of a wireless communication device 104. For the uplink, the transmitter 271 may be part of a wireless communication device 104 and the receiver 273 may be part of a base station 102.

At the transmitter 271, a transmit (TX) data processor 275 receives and processes (e.g., formats, encodes, and interleaves) data 230 and provides coded data. A modulator 212 performs modulation on the coded data and provides a modulated signal. The modulator 212 may perform Gaussian minimum shift keying (GMSK) for GSM, 8-ary phase shift keying (8-PSK) for Enhanced Data rates for Global Evolution (EDGE), etc. GMSK is a continuous phase modulation protocol, whereas 8-PSK is a digital modulation protocol. A transmitter unit (TMTR) 218 conditions (e.g., filters, amplifies and upconverts) the modulated signal and generates an RF modulated signal, which is transmitted via an antenna 220.

At the receiver 273, an antenna 222 receives RF modulated signals from the transmitter 271 and other transmitters. The antenna 222 provides a received RF signal to a receiver unit (RCVR) 224. The receiver unit 224 conditions (e.g., filters, amplifies and downconverts) the received RF signal, digitizes the conditioned signal and provides samples. A demodulator 226 processes the samples as described below and provides demodulated data. A receive (RX) data processor 228 processes (e.g., deinterleaves and decodes) the demodulated data and provides decoded data 232. In general, the processing by demodulator 226 and RX data processor 228 is complementary to the processing by the modulator 212 and the TX data processor 275, respectively, at the transmitter 271.

Controllers/processors 214 and 234 direct operation at the transmitter 271 and receiver 273, respectively. Memories 216 and 236 store program codes in the form of computer software and data used by the transmitter 271 and receiver 273, respectively.

Figure 3:
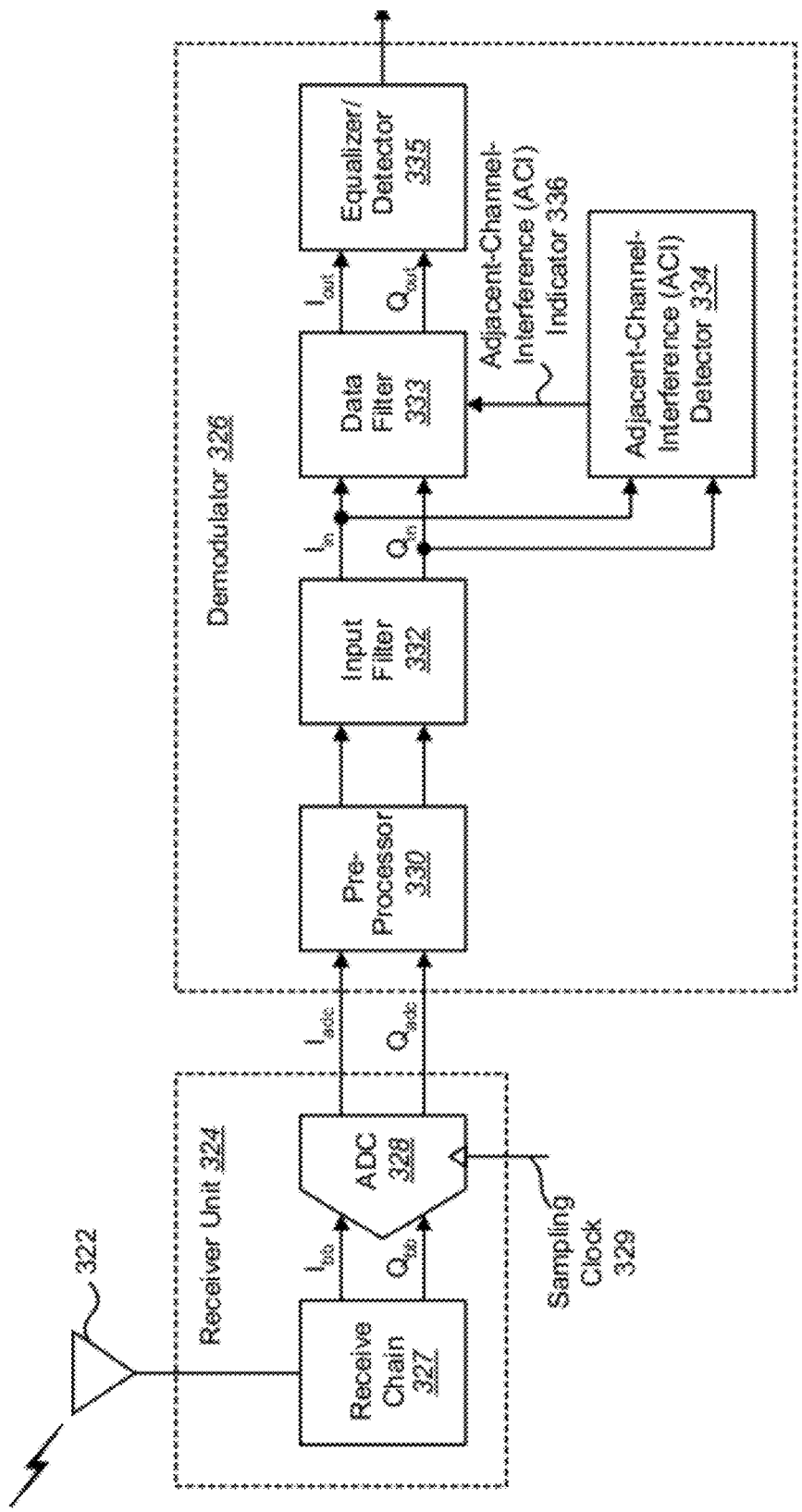
FIG. 3 shows a block diagram of a design of a receiver unit and demodulator at a receiver.

FIG. 3 shows a block diagram of a design of a receiver unit 324 and a demodulator 326 at a receiver 273. Within the receiver unit 324, a receive chain 327 processes the received RF signal received by an antenna 322 and provides I and Q baseband signals, which are denoted as $I_{bb}$ and $Q_{bb}$. The receive chain 324 may perform low noise amplification, analog filtering, quadrature downconversion, etc. An analog-to-digital converter (ADC) 328 digitizes the I and Q baseband signals at a sampling rate of $f_{adc}$ from a sampling clock 329 and provides I and Q samples, which are denoted as $I_{adc}$ and $Q_{adc}$. In general, the ADC sampling rate $f_{adc}$ may be related to the symbol rate $f_{sym}$ by any integer or non-integer factor.

Within the demodulator 326, a pre-processor 330 performs pre-processing on the I and Q samples from the analog-to-digital converter (ADC) 328. For example, the pre-processor 330 may remove direct current (DC) offset, remove frequency offset, etc. An input filter 332 filters the samples from the pre-processor 330 based on a particular frequency response and provides input I and Q samples, which are denoted as $I_{in}$ and $Q_{in}$. The input filter 332 may filter the I and Q samples to suppress images resulting from the sampling by the analog-to-digital converter (ADC) 328 as well as jammers. The input filter 332 may also perform sample rate conversion, e.g., from 24× oversampling down to 2× oversampling. A data filter 333 filters the input I and Q samples from the input filter 332 based on another frequency response and provides output I and Q samples, which are denoted as $I_{out}$ and $Q_{out}$. The input filter 332 and the data filter 333 may be implemented with finite impulse response (FIR) filters, infinite impulse response (IIR) filters, or filters of other types. The frequency responses of the input filter 332 and the data filter 333 may be selected to achieve good performance. In one design, the frequency response of the input filter 332 is fixed and the frequency response of the data filter 333 is configurable.

An adjacent-channel-interference (ACI) detector 334 receives the input I and Q samples from the input filter 332, detects for adjacent-channel-interference (ACI) in the received RF signal, and provides an adjacent-channel-interference (ACI) indicator 336 to the data filter 333. The adjacent-channel-interference (ACI) indicator 336 may indicate whether or not adjacent-channel-interference (ACI) is present and, if present, whether the adjacent-channel-interference (ACI) is due to the higher RF channel centered at +200 kilohertz (kHz) and/or the lower RF channel centered at −200 kHz. The frequency response of the data filter 333 may be adjusted based on the adjacent-channel-interference (ACI) indicator 336, to achieve desirable performance.

An equalizer/detector 335 receives the output I and Q samples from the data filter 333 and performs equalization, matched filtering, detection and/or other processing on these samples. For example, the equalizer/detector 335 may implement a maximum likelihood sequence estimator (MLSE) that determines a sequence of symbols that is most likely to have been transmitted given a sequence of I and Q samples and a channel estimate.

The Global System for Mobile Communications (GSM) is a widespread standard in cellular, wireless communication. GSM is relatively efficient for standard voice services. However, high-fidelity audio and data services require higher data throughput rates than that for which GSM is optimized. To increase capacity, the General Packet Radio Service (GPRS), EDGE (Enhanced Data rates for GSM Evolution) and UMTS (Universal Mobile Telecommunications System) standards have been adopted in GSM systems. In the GSM/EDGE Radio Access Network (GERAN) specification, GPRS and EGPRS provide data services. The standards for GERAN are maintained by the 3GPP (Third Generation Partnership Project). GERAN is a part of GSM. More specifically, GERAN is the radio part of GSM/EDGE together with the network that joins the base stations 102 (the Ater and Abis interfaces) and the base station controllers (A interfaces, etc.). GERAN represents the core of a GSM network. It routes phone calls and packet data from and to the PSTN (Public Switched Telephone Network) and Internet to and from remote terminals. GERAN is also a part of combined UMTS/GSM networks.

GSM employs a combination of Time Division Multiple Access (TDMA) and Frequency Division Multiple Access (FDMA) for the purpose of sharing the spectrum resource. GSM networks typically operate in a number of frequency bands. For example, for uplink communication, GSM-900 commonly uses a radio spectrum in the 890-915 megahertz (MHz) bands (Mobile Station to Base Transceiver Station). For downlink communication, GSM 900 uses 935-960 MHz bands (base station 102 to wireless communication device 104). Furthermore, each frequency band is divided into 200 kHz carrier frequencies providing 124 RF channels spaced at 200 kHz. GSM-1900 uses the 1850-1910 MHz bands for the uplink and 1930-1990 MHz bands for the downlink. Like GSM 900, FDMA divides the spectrum for both uplink and downlink into 200 kHz-wide carrier frequencies. Similarly, GSM-850 uses the 824-849 MHz bands for the uplink and 869-894 MHz bands for the downlink, while GSM-1800 uses the 1710-1785 MHz bands for the uplink and 1805-1880 MHz bands for the downlink.

An example of an existing GSM system is identified in technical specification document 3GPP TS 45.002 V4.8.0 (2003-06) titled "Technical Specification 3rd Generation Partnership Project; Technical Specification Group GSM/EDGE Radio Access Network; Multiplexing and multiple access on the radio path (Release 4)," published by the 3rd Generation Partnership Project (3GPP) standards-setting organization.

Each channel in GSM is identified by a specific absolute radio frequency channel (ARFCN). For example, ARFCN 1-124 are assigned to the channels of GSM 900, while ARFCN 512-810 are assigned to the channels of GSM 1900. Similarly, ARFCN 128-251 are assigned to the channels of GSM 850, while ARFCN 512-885 are assigned to the channels of GSM 1800. Also, each base station 102 is assigned one or more carrier frequencies. Each carrier frequency is divided into eight time slots (which are labeled as time slots 0 through 7) using TDMA such that eight consecutive time slots form one TDMA frame with a duration of 4.615 milliseconds (ms). A physical channel occupies one time slot within a TDMA frame. Each active wireless communication device 104 or user is assigned one or more time slot indices for the duration of a call. User-specific data for each wireless communication device 104 is sent in the time slot(s) assigned to that wireless communication device 104 and in TDMA frames used for the traffic channels.

Figure 4:
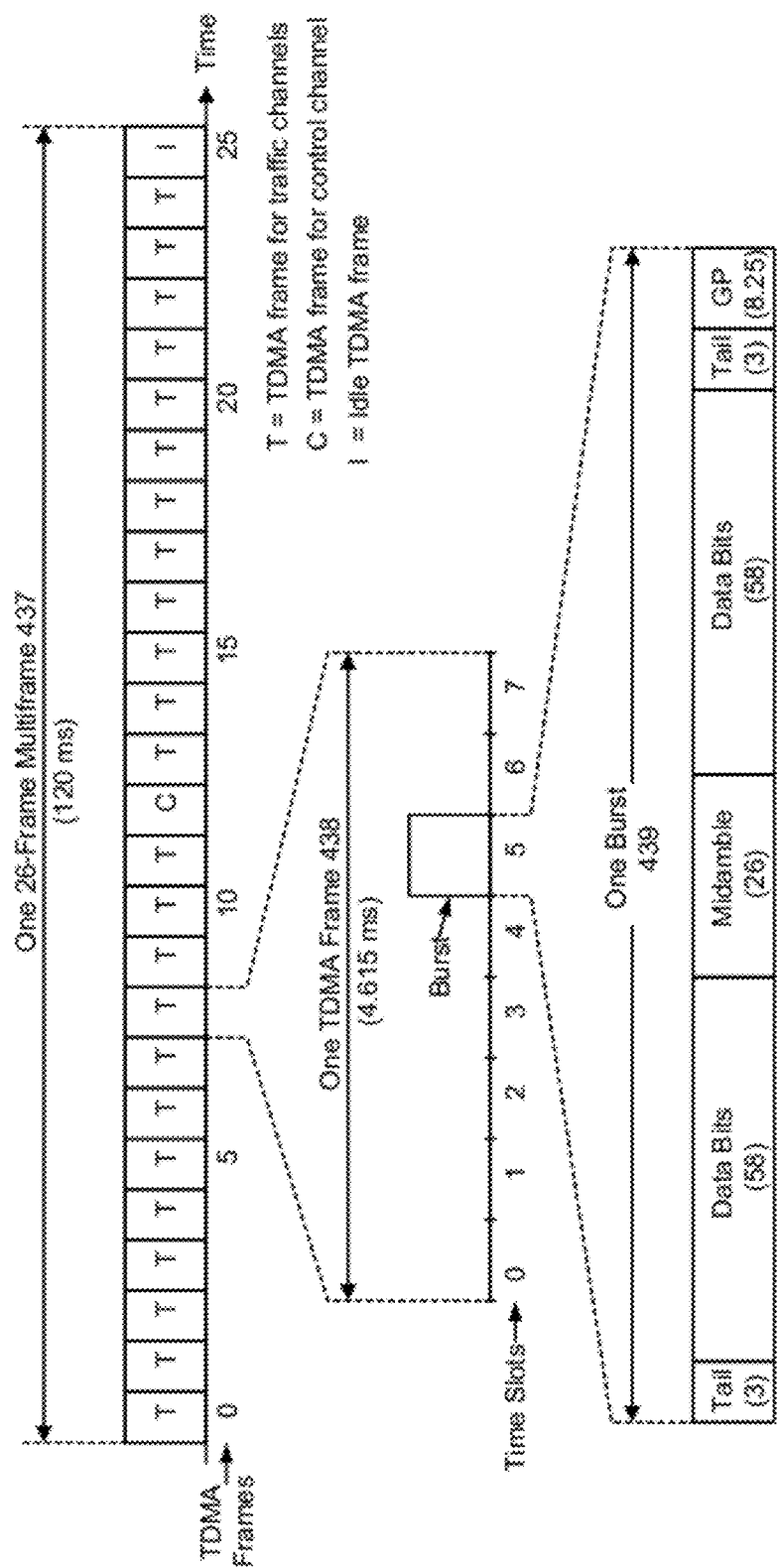
FIG. 4 shows example frame and burst formats in GSM.

FIG. 4 shows example frame and burst formats in GSM. The timeline for transmission is divided into multiframes 437. For traffic channels used to transmit user-specific data, each multiframe 437 in this example includes 26 TDMA frames 438, which are labeled as TDMA frames 0 through 25. The traffic channels are sent in TDMA frames 0 through 11 and TDMA frames 13 through 24 of each multiframe 437. A control channel is sent in TDMA frame 12. No data is sent in idle TDMA frame 25, which is used by the wireless communication devices 104 to make measurements of signals transmitted by neighbor base stations 102.

Each time slot within a frame is also referred to as a "burst" 439 in GSM. Each burst 439 includes two tail fields, two data fields, a training sequence (or midamble) field and a guard period (GP). The number of symbols in each field is shown inside the parentheses. A burst 439 includes symbols for the tail, data and midamble fields. No symbols are sent in the guard period. TDMA frames of a particular carrier frequency are numbered and formed in groups of 26 or 51 TDMA frames 438 called multiframes 437.

Figure 5:
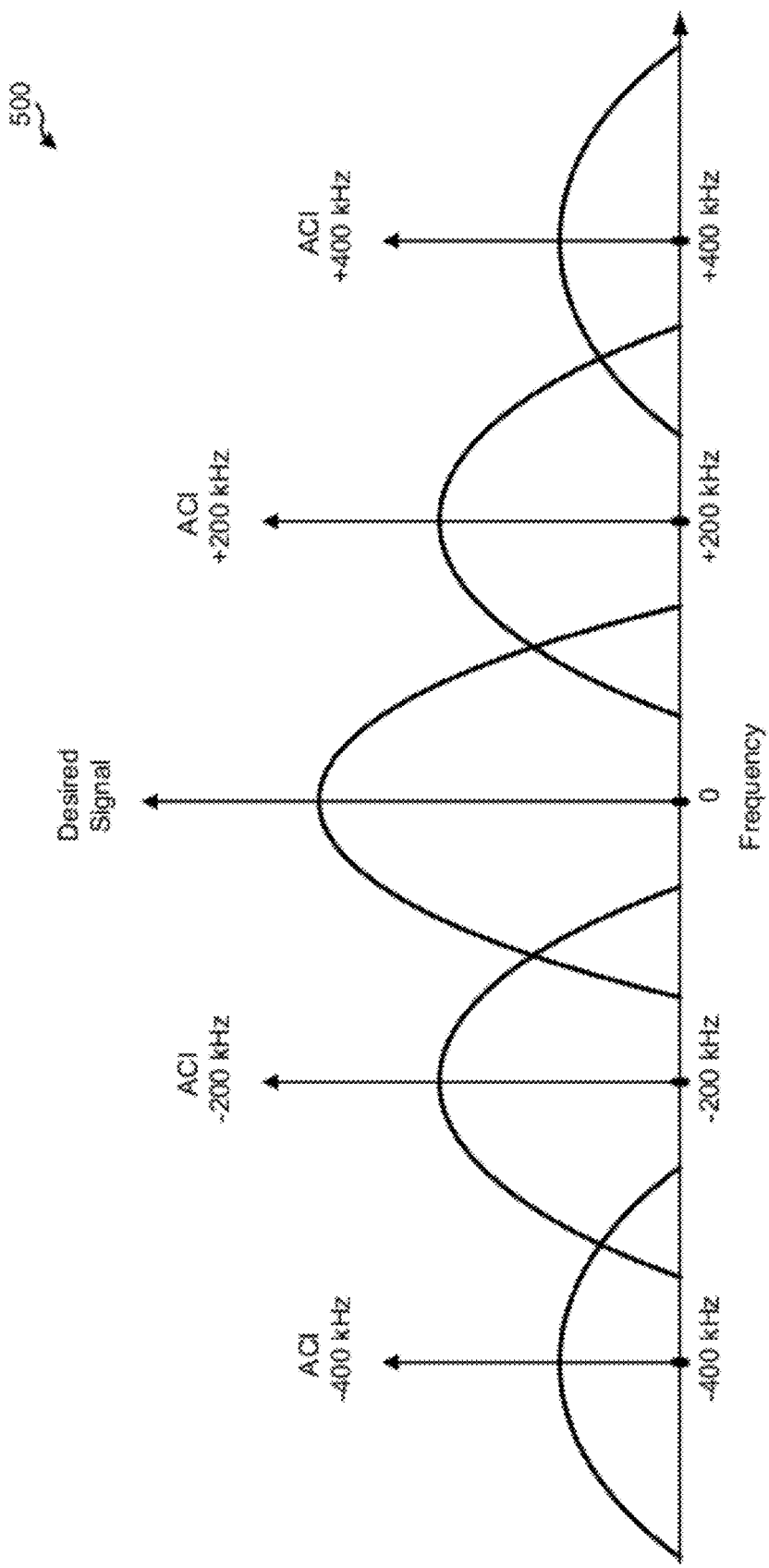
FIG. 5 shows an example spectrum in a GSM system.

FIG. 5 shows an example spectrum 800 in a GSM system. In this example, five RF modulated signals are transmitted on five RF channels that are spaced apart by 200 kHz. The RF channel of interest is shown with a center frequency of 0 Hz. The two adjacent RF channels have center frequencies that are +200 kHz and −200 kHz from the center frequency of the desired RF channel. The next two nearest RF channels (which are referred to as blockers or non-adjacent RF channels) have center frequencies that are +400 kHz and −400 kHz from the center frequency of the desired RF channel. There may be other RF channels in the spectrum 500, which are not shown in FIG. 5 for simplicity. In GSM, an RF modulated signal is generated with a symbol rate of $f_{sym}=13000/40=270.8$ kilo symbols/second (ksps) and has a −3 decibel (dB) bandwidth of up to 135 kHz. The RF modulated signals on adjacent RF channels may thus overlap one another at the edges, as shown in FIG. 5.

In GSM/EDGE, frequency bursts (FB) are sent regularly by the base station 102 to allow wireless communication devices 104 to synchronize their local oscillator (LO) to the base station 102 local oscillator (LO), using frequency offset estimation and correction. These bursts comprise a single tone, which corresponds to all "0" payload and training sequence. The all zero payload of the frequency burst is a constant frequency signal, or a single tone burst. When in power mode, the wireless communication device 104 hunts continuously for a frequency burst from a list of carriers. Upon detecting a frequency burst, the wireless communication device 104 will estimate the frequency offset relative to its nominal frequency, which is 67.7 kHz from the carrier. The wireless communication device 104 local oscillator (LO) will be corrected using this estimated frequency offset. In power up mode, the frequency offset can be as much as +/−19 kHz. The wireless communication device 104 will periodically wakeup to monitor the frequency burst to maintain its synchronization in standby mode. In the standby mode, the frequency offset is within ±2 kHz.

One or more modulation schemes are used in GERAN systems to communicate information such as voice, data and/or control information. Examples of the modulation schemes may include GMSK (Gaussian Minimum Shift Keying), M-ary QAM (Quadrature Amplitude Modulation) or M-ary PSK (Phase Shift Keying), where $M=2^n$, with n being the number of bits encoded within a symbol period for a specified modulation scheme. GMSK is a constant envelope binary modulation scheme allowing raw transmission at a maximum rate of 270.83 kilobits per second (Kbps).

General Packet Radio Service (GPRS) is a non-voice service. It allows information to be sent and received across a mobile telephone network. It supplements Circuit Switched Data (CSD) and Short Message Service (SMS). GPRS employs the same modulation schemes as GSM. GPRS allows for an entire frame (all eight time slots) to be used by a single mobile station at the same time. Thus, higher data throughput rates are achievable.

The EDGE standard uses both the GMSK modulation and 8-PSK modulation. Also, the modulation type can be changed from burst to burst. 8-PSK modulation in EDGE is a linear, 8-level phase modulation with $3\pi/8$ rotation, while GMSK is a non-linear, Gaussian-pulse-shaped frequency modulation. However, the specific GMSK modulation used in GSM can be approximated with a linear modulation (i.e., 2-level phase modulation with a $\pi/2$ rotation). The symbol pulse of the approximated GSMK and the symbol pulse of 8-PSK are identical. The EGPRS2 standard uses GMSK, QPSK, 8-PSK, 16-QAM and 32-QAM modulations. The modulation type can be changed from burst to burst. Q-PSK, 8-PSK, 16-QAM and 32-QAM modulations in EGPRS2 are linear, 4-level, 8-level, 16-level and 32-level phase modulations with $3\pi/4$, $3\pi/8$, $\pi/4$, $-\pi/4$ rotation, while GMSK is a non-linear, Gaussian-pulse-shaped frequency modulation. However, the specific GMSK modulation used in GSM can be approximated with a linear modulation (i.e., 2-level phase modulation with a $\pi/2$ rotation). The symbol pulse of the approximated GSMK and the symbol pulse of 8-PSK are identical. The symbol pulse of Q-PSK, 16-QAM and 32-QAM can use spectrally narrow or wide pulse shapes.

Figure 6:
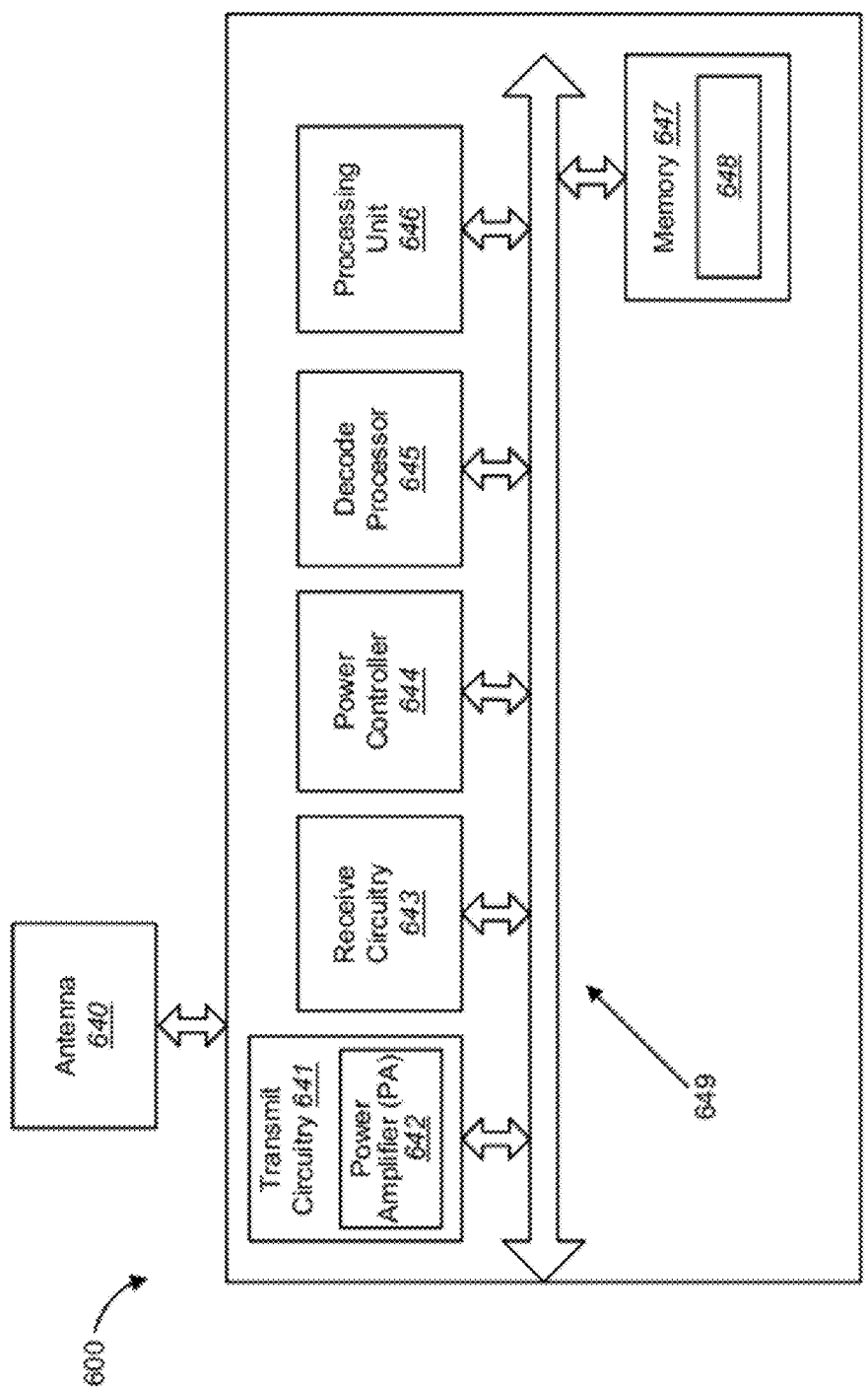
FIG. 6 illustrates an example of a wireless device that includes transmit circuitry (including a power amplifier), receive circuitry, a power controller, a decode processor, a processing unit for use in processing signals and memory.

FIG. 6 illustrates an example of a wireless device 600 that includes transmit circuitry 641 (including a power amplifier 642), receive circuitry 643, a power controller 644, a decode processor 645, a processing unit 646 for use in processing signals and memory 647. The wireless device 600 may be a base station 102 or a wireless communication device 104. The transmit circuitry 641 and the receive circuitry 643 may allow transmission and reception of data, such as audio communications, between the wireless device 600 and a remote location. The transmit circuitry 641 and receive circuitry 643 may be coupled to an antenna 640.

The processing unit 646 controls operation of the wireless device 600. The processing unit 646 may also be referred to as a central processing unit (CPU). Memory 647, which may include both read-only memory (ROM) and random access memory (RAM), provides instructions and data to the processing unit 646. A portion of the memory 647 may also include non-volatile random access memory (NVRAM).

The various components of the wireless device 600 are coupled together by a bus system 649, which may include a power bus, a control signal bus and a status signal bus in addition to a data bus. For the sake of clarity, the various busses are illustrated in FIG. 6 as the bus system 649.

The steps of the methods discussed may also be stored as instructions in the form of software or firmware located in memory 647 in a wireless device 600. These instructions may be executed by the controller/processor(s) 110 of the wireless device 600. Alternatively, or in conjunction, the steps of the methods discussed may be stored as instructions in the form of software or firmware 648 located in memory 647 in the wireless device 600. These instructions may be executed by the processing unit 646 of the wireless device 600 in FIG. 6.

Figure 7:
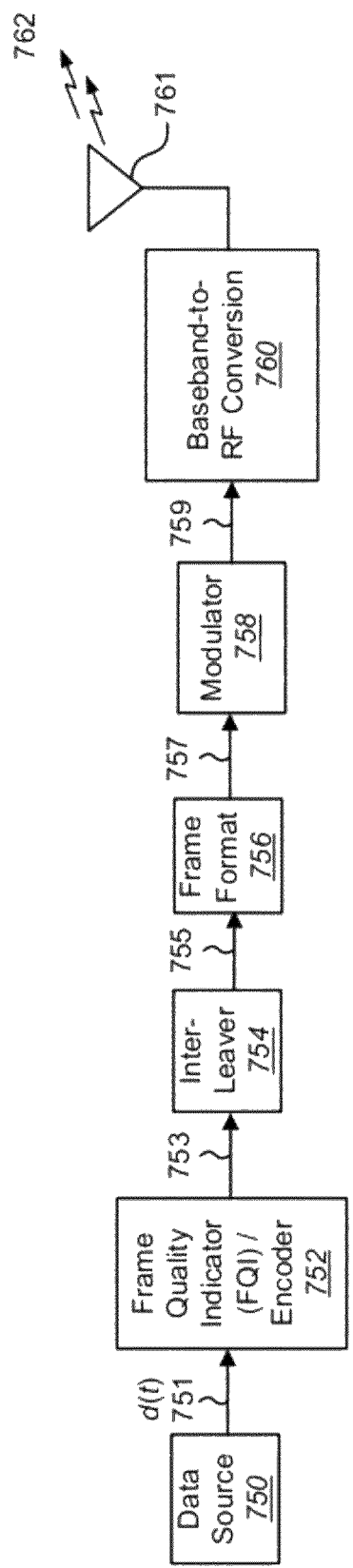
FIG. 7 illustrates an example of a transmitter structure and/or process.

FIG. 7 illustrates an example of a transmitter structure and/or process. The transmitter structure and/or process of FIG. 7 may be implemented in a wireless device such as a wireless communication device 104 or a base station 102. The functions and components shown in FIG. 7 may be implemented by software, hardware or a combination of software and hardware. Other functions may be added to FIG. 7 in addition to or instead of the functions shown.

In FIG. 7, a data source 750 provides data d(t) 751 to a frame quality indicator (FQI)/encoder 752. The frame quality indicator (FQI)/encoder 752 may append a frame quality indicator (FQI) such as a cyclic redundancy check (CRC) to the data d(t). The frame quality indicator (FQI)/encoder 752 may further encode the data and frame quality indicator (FQI) using one or more coding schemes to provide encoded symbols 753. Each coding scheme may include one or more types of coding, e.g., convolutional coding, Turbo coding, block coding, repetition coding, other types of coding or no coding at all. Other coding schemes may include automatic repeat request (ARQ), hybrid ARQ (H-ARQ) and incremental redundancy repeat techniques. Different types of data may be encoded with different coding schemes.

An interleaver 754 interleaves the encoded data symbols 753 in time to combat fading and generates symbols 755. The interleaved symbols 755 may be mapped by a frame format block 756 to a pre-defined frame format to produce a frame 757. In an example, a frame format block 756 may specify the frame 757 as being composed of a plurality of sub-segments. Sub-segments may be any successive portions of a frame 757 along a given dimension, e.g., time, frequency, code or any other dimension. A frame 757 may be composed of a fixed plurality of such sub-segments, each sub-segment containing a portion of the total number of symbols allocated to the frame. In one example, the interleaved symbols 755 are segmented into a plurality S of sub-segments making up a frame 757.

A frame format block 756 may further specify the inclusion of, for example, control symbols (not shown) along with the interleaved symbols 755. Such control symbols may include, power control symbols, frame format information symbols, etc.

A modulator 758 modulates the frame 757 to generate modulated data 759. Examples of modulation techniques include binary phase shift keying (BPSK) and quadrature phase shift keying (QPSK). The modulator 758 may also repeat a sequence of modulated data.

A baseband-to-radio-frequency (RF) conversion block 760 may convert the modulated signal 759 to RF signals for transmission via an antenna 761 as signal 762 over a wireless communication link to one or more wireless device receivers.

Existing Global Systems for Mobile Communications (GSM) enhanced data rates for GSM Evolution (EDGE) (GERAN) wireless cellular networks are designed primarily to provide services to human users. The networks are dimensioned to serve a limited set of users per cell. Increasingly, networks need to provide a new class of service to users that include wireless communication devices 104 that do not require human intervention. These wireless communication devices 104 may be referred to as machine type communication (MTC) devices or machine to machine communication (M2M) devices. One example of a machine type communication (MTC) device is a smart meter that automatically reports a measured reading to a machine type communication (MTC) server on a regular basis. A machine type communication (MTC) server may be part of a core network. Thus, a machine type communication (MTC) device may report a measured reading to a base station 102 and the base station 102 may relay the measured reading to the machine type communication (MTC) server on the core network. Other examples of machine type communication (MTC) devices include personal health monitors, vehicle/goods tracking devices, environmental monitors and security monitors.

It should be noted that smartphones and similar wireless communication devices 104 can exhibit, from the network's point of view, many of the characteristics of machine type communication (MTC) devices. In particular, software applications running on such devices may interact with the network to access remote servers, without human intervention. Examples of such an application include email clients and social networking applications that periodically poll a remote server to check for new emails or updates. For this reason, references to machine type communication (MTC) devices should be interpreted as including all mobile communication devices and applications that exhibit MTC-device type behavior.

For machine type communication (MTC) device applications, it is possible to have a very large number of machine type communication (MTC) devices within a very small geographic area. Particularly, it is possible to have a large number of machine type communication (MTC) devices in the same cell. Each machine type communication (MTC) device may need to communicate with the network on a frequent basis, leading to overloading of the network.

Much of the data reported by the machine type communication (MTC) devices is expected to be small and bursty in nature. For uplink data transfers, the base station 102 may use the downlink data traffic channel to transmit an acknowledgement message to each machine type communication (MTC) device. The acknowledgement message sent by the base station 102 may be a Packet Uplink Ack/Nack (PUAN). Transmitting an individual Packet Uplink Ack/Nack (PUAN) to each machine type communication (MTC) device within a single cell may take a lot of network bandwidth.

Figure 8:
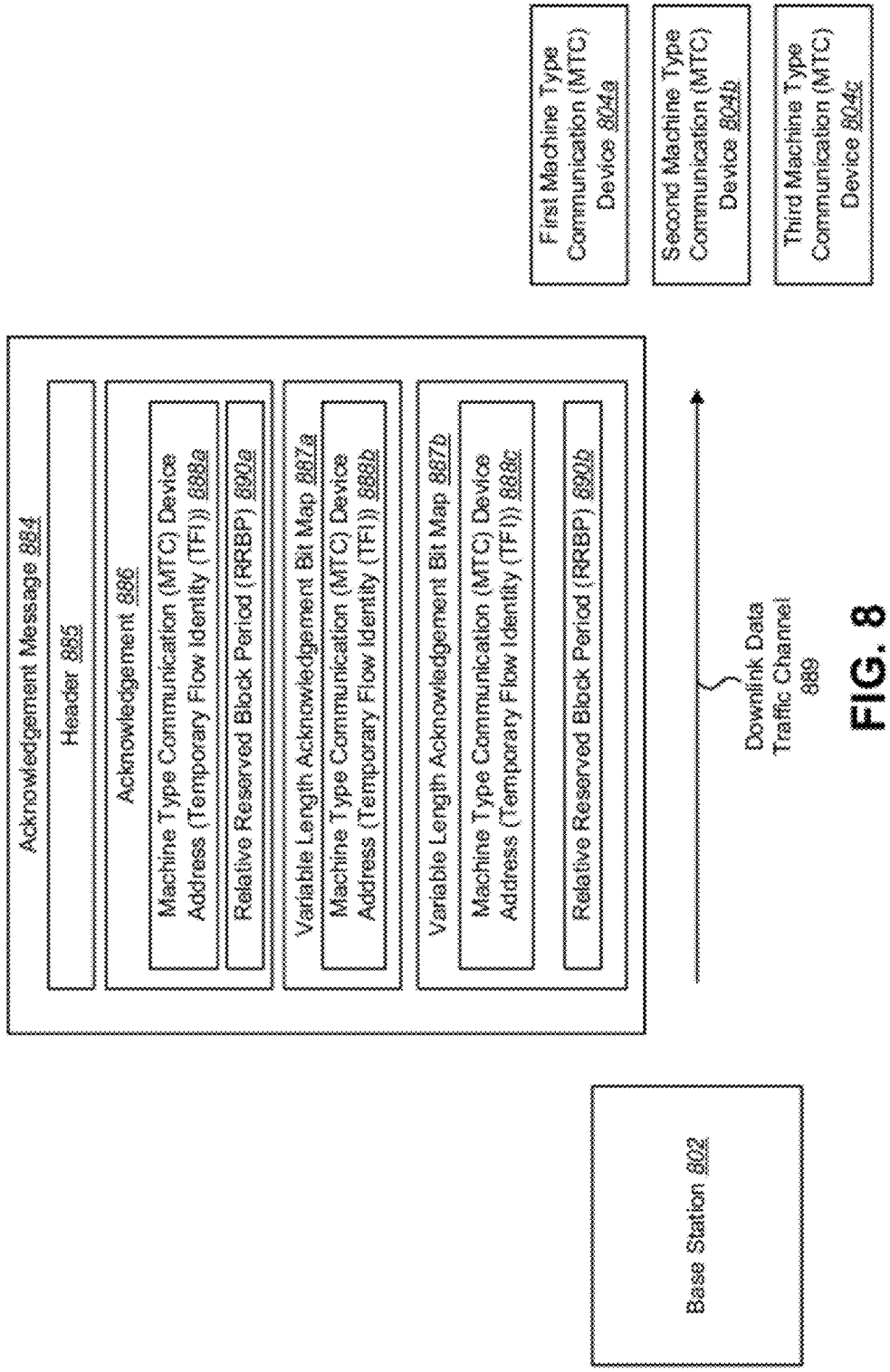
FIG. 8 is a block diagram illustrating an acknowledgement message sent from a base station to multiple machine type communication (MTC) devices.

FIG. 8 is a block diagram illustrating an acknowledgement message 884 sent from a base station 802 to multiple machine type communication (MTC) devices 804*a-c*. The base station 802 of FIG. 8 may be one configuration of the base stations 102 illustrated in FIG. 1. The machine type communication (MTC) devices 804*a-c* of FIG. 8 may be one configuration of the wireless communication devices 104 of FIG. 1. The base station 802 may transmit an acknowledgement message 884 to multiple machine type communication (MTC) devices 804 via downlink data traffic channel 889.

One way to reduce the bandwidth used in acknowledgement signaling messages is to increase the number of machine type communication (MTC) devices 804 that can be addressed in one acknowledgement message 884. This may be accomplished by removing redundant information from an acknowledgement message 884 and using the extra space to fit Ack/Nack information for each machine type communication (MTC) device 804 addressed within the acknowledgement message 884. This may lead to an increase in the downlink network capacity. In one configuration, a single acknowledgement message 884 may provide a Packet Uplink Ack/Nack (PUAN) for up to 15 different machine type communication (MTC) devices 804. Using a single acknowledgement message 884 may provide maximum benefits when each machine type communication (MTC) device 804 needs to transmit a small amount of data periodically. Using a single acknowledgement message 884 is complementary to the existing acknowledgement mechanism within GERAN, which involves addressing a single device per acknowledgement message.

The base station 802 may periodically generate an acknowledgement message 884 after receiving data from the plural machine type communication (MTC) devices 804. In one configuration, the data received by the base station 802 from the machine type communication (MTC) devices 804 may be radio link control (RLC) data blocks. A base station 802 may receive plural radio link control (RLC) data blocks from a machine type communication (MTC) device 802 prior to generating and transmitting an acknowledgement message 884 to the machine type communication (MTC) device 804. Thus, if the base station 802 has received some of the radio link control (RLC) data blocks from a machine type communication (MTC) device 804 successfully and others unsuccessfully, the base station 802 may indicate to the machine type communication (MTC) device 804 in the acknowledgement message 884 which data blocks need to be resent.

An acknowledgement message 884 may include only the essential information for each addressed device. By including only the essential information in an acknowledgement message 884, the number of bits used to acknowledge radio link control (RLC) data blocks received by the base station 802 may be reduced. By reducing the number of bits in an acknowledgement message 884, the acknowledgement message 884 may include acknowledgement information for more than one machine type communication (MTC) device 804 within the same message.

The acknowledgement message 884 of FIG. 8 is shown with acknowledgement information for three machine type communication (MTC) devices 804: a first machine type communication (MTC) device 804*a*, a second machine type communication (MTC) device 804*b* and a third machine type communication (MTC) device 804*c*. However, an acknowledgement message 884 may include acknowledgement information for up to 15 machine type communication (MTC) devices 804, depending on the number of bits used for each acknowledgement/negative acknowledgement (Ack/Nack).

The acknowledgement message 884 may include a header 885. However, the Enhanced General Packet Radio Service (EGPRS) Supplementary/Polling (ES/P) field in the header 885 of the acknowledgement message 884 is not used, because plural devices are being addressed. In the current specification, the ES/P bit is relevant to the wireless communication device 104 addressed by a downlink Radio Link Control (RLC)/Media Access Control (MAC) message. With the proposed Packet Uplink Ack/Nack (PUAN) structure shown in FIG. 8, more than one wireless communication device 104 may be addressed, in which case the ES/P field is not used.

Every device that is to be addressed by a Packet Uplink Ack/Nack (PUAN) has its address within the Packet Uplink Ack/Nack (PUAN). The machine type communication (MTC) device address 888 may be a Temporary Flow Identity (TFI). In an acknowledgement message 884, each addressed device may have one of three options. In a first option, the acknowledgement message 884 includes an acknowledgement 886 for the machine type communication (MTC) device 804. The acknowledgement 886 includes a machine type communication (MTC) device address 888a. The acknowledgement 886 may also include a relative reserved block period (RRBP) 890a. In a second option, the acknowledgement message 884 may include a variable length acknowledgement bit map 887a. The variable length acknowledgement bit map 887a may be an Ack/Nack bitmap. The variable length acknowledgement bit map 887a may include a machine type communication (MTC) device address 888b. In a third option, the acknowledgement message 884 may include a variable length acknowledgement bit map 887b. The variable length acknowledgement bit map 887b may also be an Ack/Nack bitmap. However, in the third option, the variable length acknowledgement bit map 887b may include both a machine type communication (MTC) device address 888c and a relative reserved block period (RRBP) 890b.

An acknowledgement 886 may be used for each machine type communication (MTC) device 804 that has successfully transferred all the radio link control (RLC) data blocks. An acknowledgement 886 may be used to inform a machine type communication (MTC) device 804 that all the radio link control (RLC) data blocks have been received by the network.

As discussed above, the acknowledgement message 884 may include a relative reserved block period (RRBP) 890a. The relative reserved block period (RRBP) 890a may be used to obtain feedback from a wireless communication device 104 such as a machine type communication (MTC) device 804. This feedback may confirm that the wireless communication device 104 has received a message (the Packet Uplink Ack/Nack (PUAN) in this case). The number of relative reserved block period (RRBP) 890 bits may be extended from the 2 bits used earlier. In one configuration, the number of relative reserved block period (RRBP) 890 bits may be 4 bits.

A variable length acknowledgement bit map 887 may be used for each machine type communication (MTC) device 804 that has not yet successfully transferred all of the radio link control (RLC) data blocks to the network. The variable length acknowledgement bit map 887 may indicate to the machine type communication (MTC) device 804 which radio link control (RLC) data blocks were not successfully received (and thus need to be re-transmitted). Using variable length acknowledgement bit maps 887 may allow the acknowledgement message 884 to include acknowledgement information for other machine type communication (MTC) devices 804 within the same acknowledgement message 884.

An acknowledgement message 884 may include a combination of acknowledgements 886 for some wireless communication devices 104 and variable length acknowledgement bit maps 887 for other wireless communication devices 104. The presence of relative reserved block period (RRBP) 890 information within the acknowledgement message 884 implies that the machine type communication (MTC) device 804 is polled so it will provide Packet Control Acknowledgement (PCA).

Figure 9:
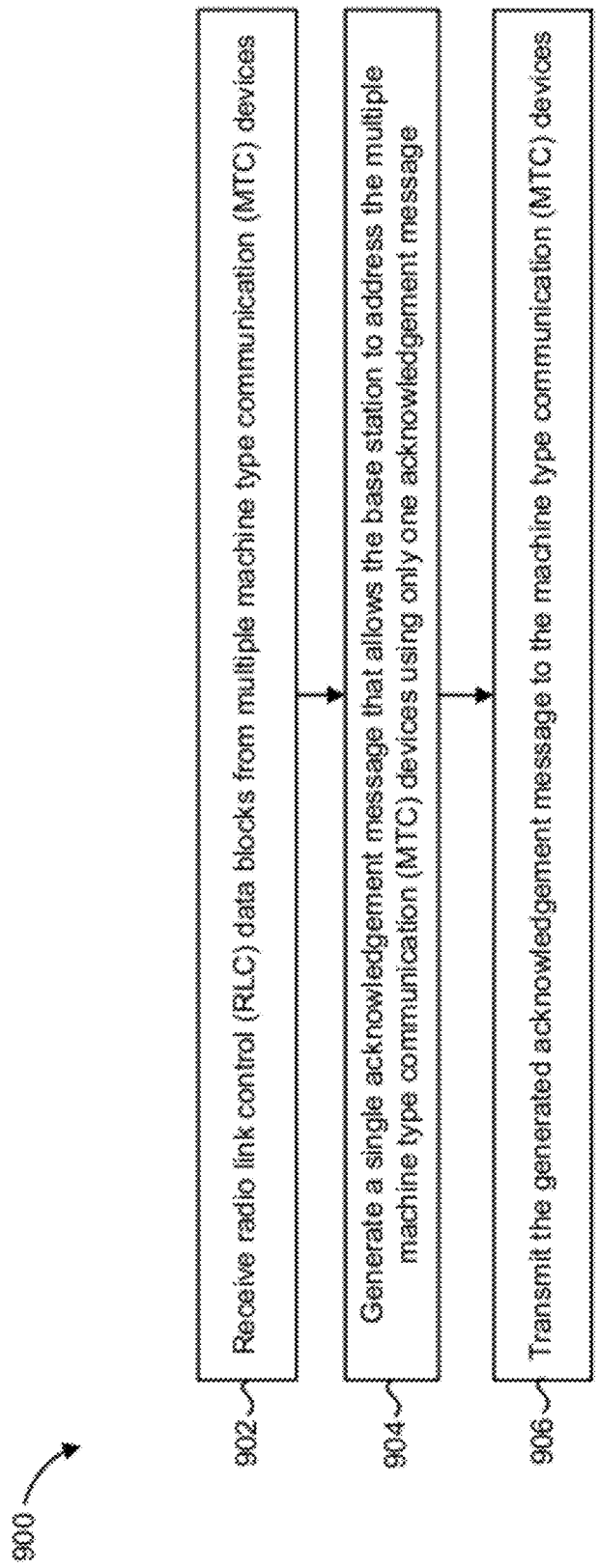
FIG. 9 is a flow diagram of a method for communicating with multiple machine type communication (MTC) devices using a single acknowledgement message.

FIG. 9 is a flow diagram of a method 900 for communicating with multiple machine type communication (MTC) devices 804 using a single acknowledgement message 884. The method 900 may be performed by a base station 802. The base station 802 may receive 902 radio link control (RLC) data blocks from plural machine type communication (MTC) devices 804. The base station 802 may generate 904 a single acknowledgement message 884 that allows the base station 802 to address the multiple machine type communication (MTC) devices 804 using only one acknowledgement message 884.

The single acknowledgement message 884 may include a combination of acknowledgements 886 for one or more machine type communication (MTC) devices 804 and acknowledgement bit maps (i.e., variable length acknowledgement bit maps 887 that have been filled with acknowledgement information) for one or more other machine type communication (MTC) devices 804. The generated single acknowledgement message 884 may not allow the base station 802 to address multiple machine type communication (MTC) devices 804 that are transmitting radio link control (RLC) data blocks to the base station 802. A single acknowledgement message 884 allows the base station 802 to address up to 15 machine type communication (MTC) devices 804. The base station 802 may transmit 906 the generated acknowledgement message 884 to the machine type communication (MTC) devices 804. In one configuration, the base station 802 may transmit 906 the generated acknowledgement message 884 to multiple machine type communication (MTC) devices 804 using the same time and/or frequency resources. The base station 802 may transmit 906 the acknowledgement message 884 via the downlink data traffic channel 889.

Figure 10:
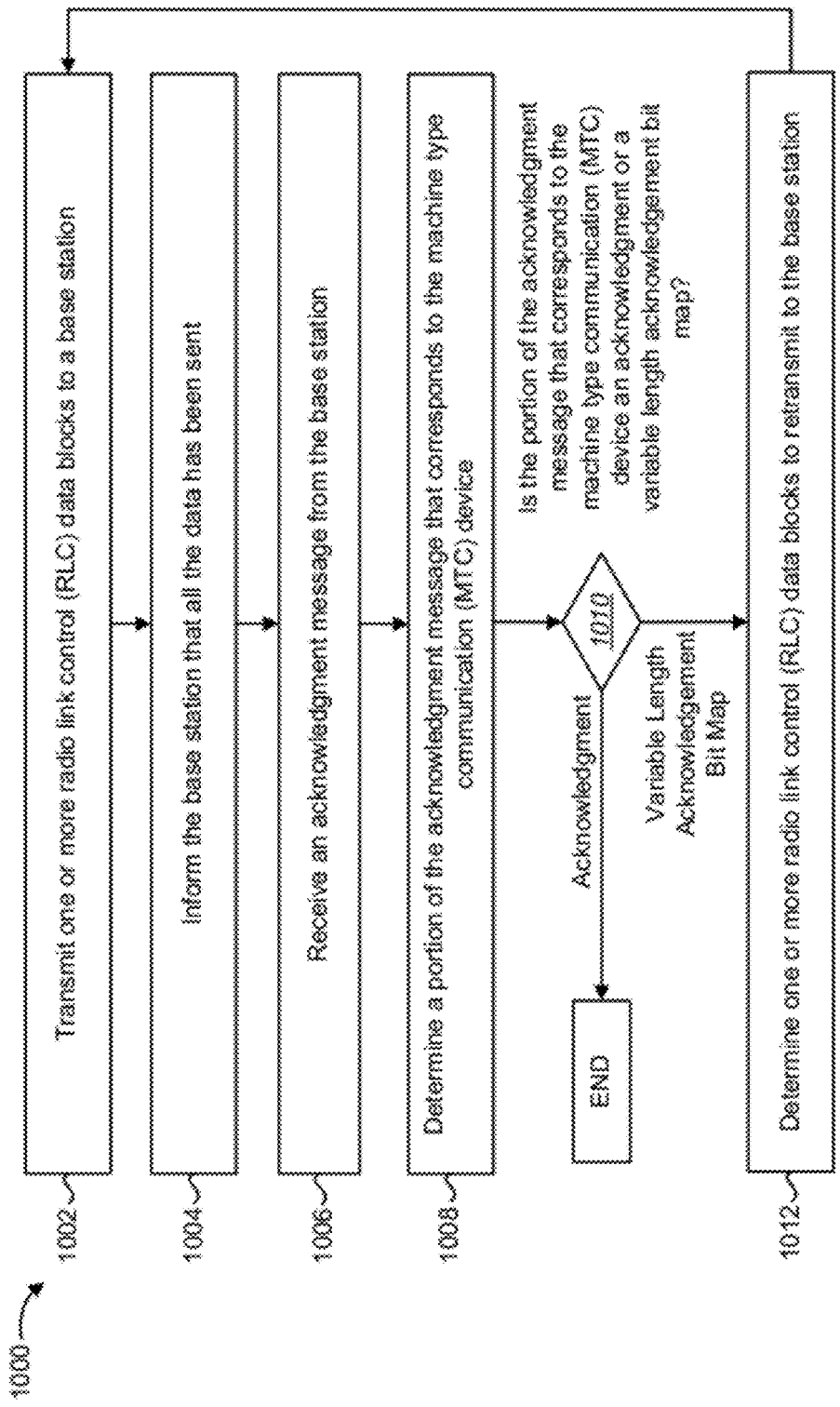
FIG. 10 is a flow diagram of a method for receiving an acknowledgement message that is directed toward multiple machine type communication (MTC) devices.

FIG. 10 is a flow diagram of a method 1000 for receiving an acknowledgement message 884 that is directed toward plural machine type communication (MTC) devices 804. The method 1000 may be performed by a machine type communication (MTC) device 804. The machine type communication (MTC) device 804 may transmit 1002 one or more radio link control (RLC) data blocks to a base station 802. Once the machine type communication (MTC) device 804 has sent all the data, the machine type communication (MTC) device 804 may inform 1004 the base station 802 that all the data has been sent. The machine type communication (MTC) device 804 may then await acknowledgement from the base station 802.

The machine type communication (MTC) device 804 may receive 1006 an acknowledgement message 884 from the base station 802. The acknowledgement message 884 may be a Packet Uplink Ack/Nack (PUAN). Thus, the acknowledgement message 884 may be used by the base station 802 to address multiple machine type communication (MTC) devices 804. The acknowledgement message 884 includes a machine type communication (MTC) device address 888 that identifies the machine type communication (MTC) device 804 as one of the machine type communication (MTC) devices 804 addressed by the acknowledgement message 884. The machine type communication (MTC) device address 888 is a Temporary Flow Identifier (TFI). The machine type communication (MTC) device 804 may determine 1008 a portion of the acknowledgement message 884 that corresponds to the machine type communication (MTC)

device 804 (i.e., the portion of the acknowledgement message 884 that corresponds to the machine type communication (MTC) device address 888).

The machine type communication (MTC) device 804 may determine 1010 whether the portion of the acknowledgement message 884 that corresponds to the machine type communication (MTC) device 804 is an acknowledgement 886 or a variable length acknowledgement bit map 887. If it is determined 1010 that the portion of the acknowledgement message 884 that corresponds to the machine type communication (MTC) device 804 is an acknowledgement 886, the method 1000 may end (the base station 802 having correctly received all of the radio link control (RLC) data blocks from the machine type communication (MTC) device 804) and the temporary block flow (TBF) may be released. If the portion of the acknowledgement message 884 that corresponds to the machine type communication (MTC) device 804 is a variable length acknowledgement bit map 887, the machine type communication (MTC) device 804 may determine 1012 one or more radio link control (RLC) data blocks to re-transmit to the base station 802. The machine type communication (MTC) device 804 may then re-transmit 1002 the one or more determined radio link control (RLC) data blocks to the base station 802.

Figure 11:
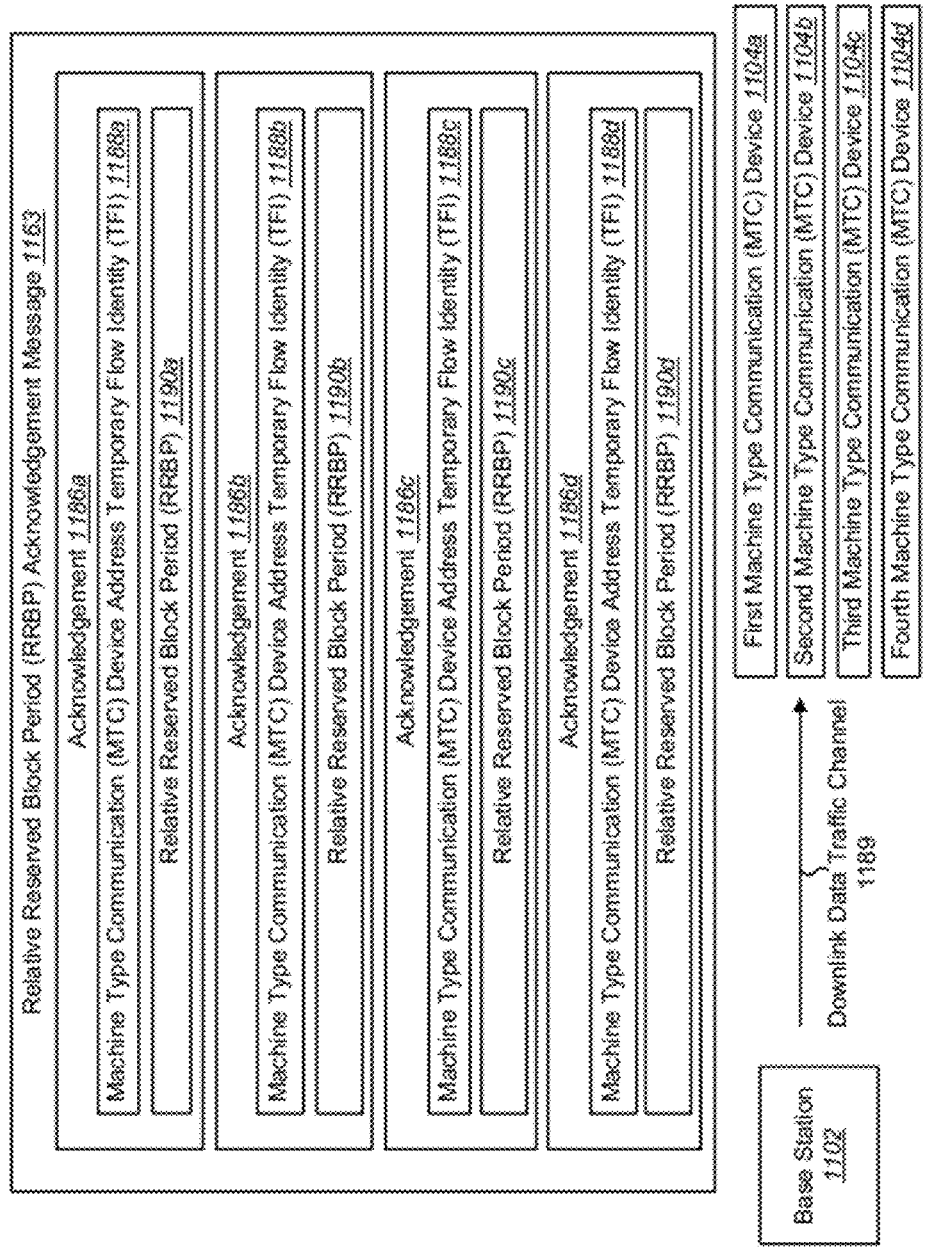
FIG. 11 is a block diagram illustrating a relative reserved block period (RRBP) acknowledgement message sent from a base station to multiple machine type communication (MTC) devices.

FIG. 11 another is block diagram illustrating a relative reserved block period (RRBP) acknowledgement message 1163 sent from a base station 1102 to multiple machine type communication (MTC) devices 1104a-d. Following successful receipt of all radio link control (RLC) blocks from the machine type communication (MTC) devices 1104a-d, the base station 1102 may transmit a relative reserved block period (RRBP) acknowledgement message 1163 to the machine type communication (MTC) devices 1104a-d the form of a Packet Uplink Ack/Nack (PUAN) message, as described above. The relative reserved block period (RRBP) acknowledgement message 1163 is indicative of a period in the form of a frame within a Relative Reserved Block Period (RRBP) 1190a-d, within which each of the machine type communication (MTC) devices 1104a-d is to transmit an acknowledgement to the base station 1102. For clarity, the relative reserved block period (RRBP) acknowledgement message 1163 includes only acknowledgements 1186a-d from the base station 1102, and does not include, for example, variable length acknowledgement bit maps 887.

When a machine type communication (MTC) device 1104 has received a relative reserved block period (RRBP) acknowledgement message 1163 from the base station 1102 that includes an acknowledgement 1186 directed to that machine type communication (MTC) device 1104, the machine type communication (MTC) device 1104 may transmit a device acknowledgement back to the base station 1102 that serves to acknowledge receipt of the acknowledgment 1186 by the machine type communication (MTC) device 1104. In one configuration, the device acknowledgement may be a packet control acknowledgement (PCA).

Regarding device acknowledgments from the machine type communication (MTC) devices 1104 or wireless communication devices 104, the GSM standard defines two modes for transmitting such device acknowledgements: Access Burst and Normal Burst modes. In Access Burst mode, the device acknowledgement is sent in each of the four frames of a radio block (that is, the device acknowledgement is repeated four times within the radio block). In Normal Burst mode, the acknowledgement is sent only once, but the data associated with the device acknowledgment is redundantly encoded and distributed across the entire radio block. Both modes incorporate redundancy to maximize the chance of the device acknowledgement reaching the base station 1102 from the machine type communication (MTC) device 1104 or wireless communication device 104.

While such redundancy increases robustness, it can have the effect of increasing network traffic undesirably in certain circumstances. A particular situation in which excessive data redundancy can have a negative impact is where multiple machine type communication (MTC) devices 1104 are communicating with the network. Since most machine type communication (MTC) devices 1104 are static, the channel between them and their associated base station 1102 is likely to be well understood by the base station 1102. In such circumstances, there may be an opportunity to reduce network traffic by reducing the amount of data redundancy utilized in signaling between machine type communication (MTC) devices 1104 and the network, thereby reducing network traffic. In many cases this can be achieved without significantly increasing the number of retransmissions of data due to the data not all being successfully received, resulting in increased overall efficiency of network resource utilization.

Each of the machine type communication (MTC) devices 1104 receives and decodes the relative reserved block period (RRBP) acknowledgement message 1163 from the base station 1102. From the decoded relative reserved block period (RRBP) acknowledgement message 1163, each machine type communication (MTC) device 1104 is able to determine the relative reserved block period (RRBP) 1190 that the machine type communication (MTC) device 1104 should transmit its packet control acknowledgement (PCA) to the base station 802 on (based on the machine type communication (MTC) device address (Temporary Flow Identity (TFI)) 1188a-d of each acknowledgement 1186a-d). More particularly, by determining its relative position within a list of machine type communication (MTC) devices 1104 in the decoded relative reserved block period (RRBP) acknowledgement message 1163, each machine type communication (MTC) device 1104 can determine the particular frame within which it should transmit its device acknowledgement. The list of machine type communication (MTC) devices 1104 may be a list of the addresses of multiple wireless communication devices 104.

Figure 12:
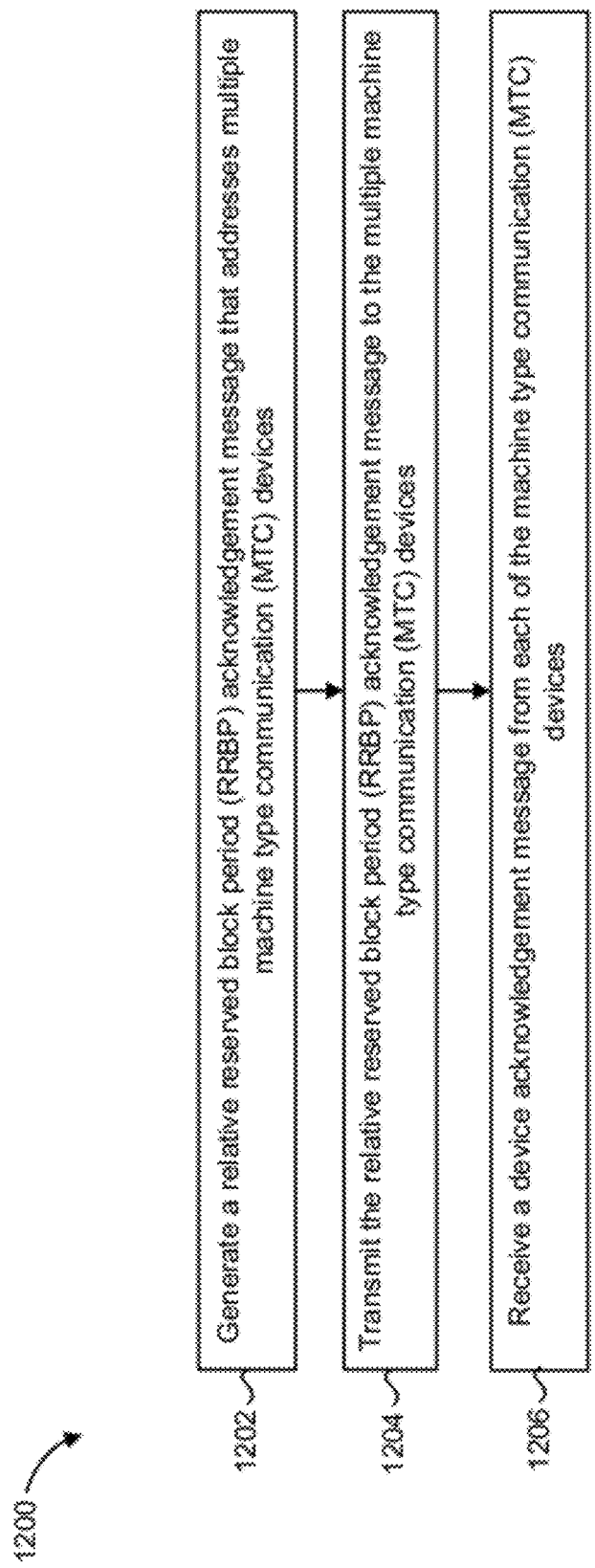
FIG. 12 is a flow diagram of a method for enhanced transmission of a single relative reserved block period (RRBP) acknowledgement message to multiple machine type communication (MTC) devices.

In the example shown in FIG. 11, the machine type communication (MTC) devices 1104 appear in the following order:
1. First machine type communication (MTC) device 1104a
2. Second machine type communication (MTC) device 1104b
3. Third machine type communication (MTC) device 1104c
4. Fourth machine type communication (MTC) device 1104d The frame offsets are therefore allocated as follows:
First machine type communication (MTC) device 1104a=0 frame offset
Second machine type communication (MTC) device 1104b=1 frame offset
Third machine type communication (MTC) device 1104c=2 frame offset
Fourth machine type communication (MTC) device 1104d=3 frame offset FIG. 12 is a flow diagram of a method 1200 for enhanced transmission of a single relative reserved block period (RRBP) acknowledgement message 1163 to multiple machine type communication (MTC) devices 1104. The method 1200 may be performed by a base station 1102. The base station 1102 may generate 1202 a relative reserved block period (RRBP) acknowledgement message 1163 that addresses multiple machine type communication (MTC)

devices 1104. As discussed above, the relative reserved block period (RRBP) acknowledgement message 1163 may include a relative reserved block period (RRBP) 1190 for each addressed machine type communication (MTC) device 1104.

The base station 1102 may transmit 1204 the relative reserved block period (RRBP) acknowledgement message 1163 to the multiple machine type communication (MTC) devices 1104. The base station 1102 may then receive 1206 a device acknowledgement message from each of the machine type communication (MTC) devices 1102. In one configuration, a device acknowledgement message may be a packet control acknowledgement (PCA) message. Each packet control acknowledgement (PCA) message may be transmitted in the relative reserved block period (RRBP) 1190 assigned to each machine type communication (MTC) device 1104.

In one configuration, a group of wireless communication devices 1104 may send a device acknowledgement message at the same time. This may result in a high probability that the transmissions by each wireless communication device 1104 interfere with each other, resulting in the base station 1102 being unable to decode any of the device acknowledgement messages.

Figure 13:
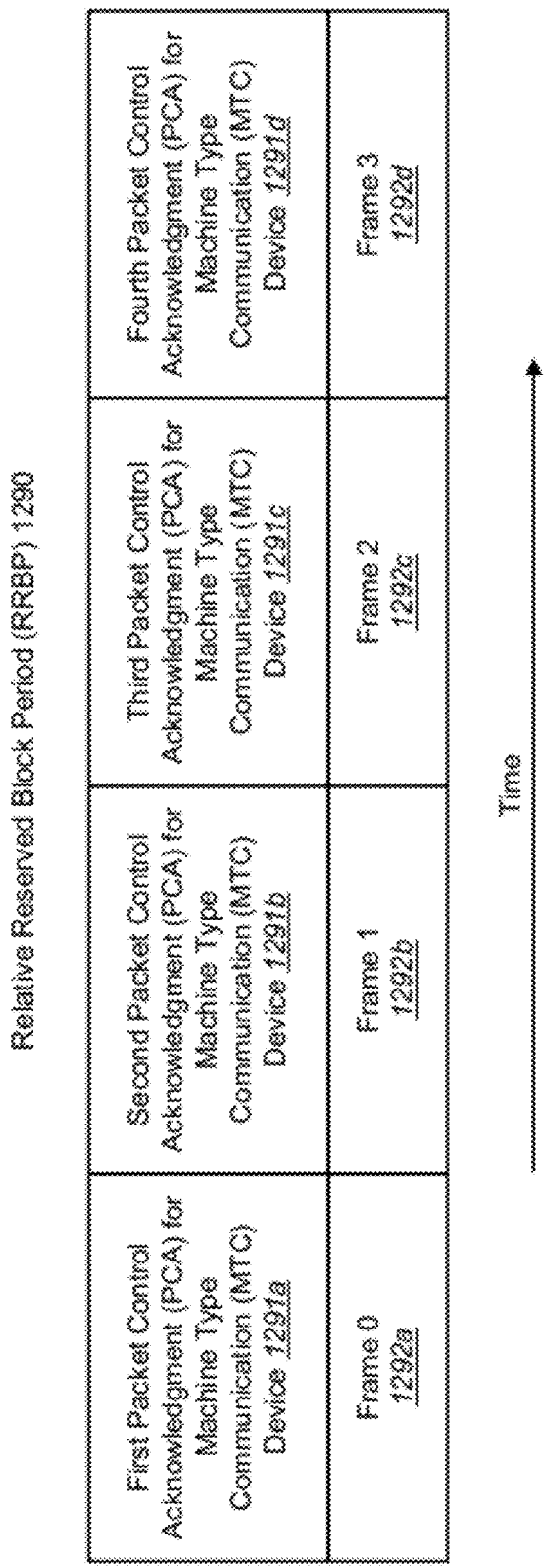
FIG. 13 is a block diagram illustrating the transmission of device acknowledgements by machine type communication (MTC) devices during a relative reserved block period (RRBP)

FIG. 13 is a block diagram illustrating the transmission of device acknowledgements by machine type communication (MTC) devices 1104 during a relative reserved block period (RRBP) 1290. In one configuration, each device acknowledgement may be a packet control acknowledgement (PCA) 1291a-d. During Frame 0 1292a, the packet control acknowledgement (PCA) 1291a for the first machine type communication (MTC) device 1104a is transmitted. During Frame 1 1292b, the packet control acknowledgement (PCA) 1291b for the second machine type communication (MTC) device 1104b is transmitted. During Frame 2 1292c, the packet control acknowledgement (PCA) 1291c for the third machine type communication (MTC) device 1104c is transmitted. During Frame 3 1292d, the packet control acknowledgement (PCA) 1291d for the fourth machine type communication (MTC) device 1104d is transmitted.

The base station 1102 knows which device acknowledgment corresponds to each machine type communication (MTC) device 1104, because the base station 1102 knows the frames 1292 within which to expect the device acknowledgements for each machine type communication (MTC) device 1104. As such, it is not necessary for each packet control acknowledgement (PCA) 1291 to specify which machine type communication (MTC) device 1104 it has been sent from. In the example shown, the relative reserved block period (RRBP) 1290 is the same for each of the machine type communication (MTC) devices 1104. In other configurations, the relative reserved block period (RRBP) 1290 may not be the same for each machine type communication (MTC) device 1104.

The relative reserved block period (RRBP) acknowledgment message 1163 transmitted by the base station 1102 may indicate the manner in which the device acknowledgement messages are to be transmitted. The machine type communication (MTC) devices 1104 then know how to use the indicated method instead of one of the legacy methods involving Access Burst or Normal Burst modes (both of which require an entire radio block to be used for each device acknowledgement for each machine type communication (MTC) device 1104). The indication can be, for example, an explicit flag or instruction in the relative reserved block period (RRBP) acknowledgement message 1163 indicating that device acknowledgements are to be provided from the machine type communication (MTC) devices 1104 using a single burst.

Single burst mode may be accomplished by having a field in a broadcast message SYSTEM INFORMATION TYPE 13 with a GPRS Cell Options information element (3GPP TS 44.060 section 12.24). A Release x extension may be added using the following sample code:

```
{       -- Rel-x extension:
    < 0 | 1 ACCESS_BURST_LENGTH : bit > }
    < spare bit > ** } // ;.
```

If the ACCESS BURST LENGTH field is not present, then a base station 1102 may send a packet control acknowledgement (PCA) using four access bursts. If ACCESS BURST LENGTH field is present, then a value of 0 indicates that the packet control acknowledgement (PCA) is sent using one access burst while a value of 1 indicates that the packet control acknowledgement (PCA) is sent using two access bursts.

Figure 14:
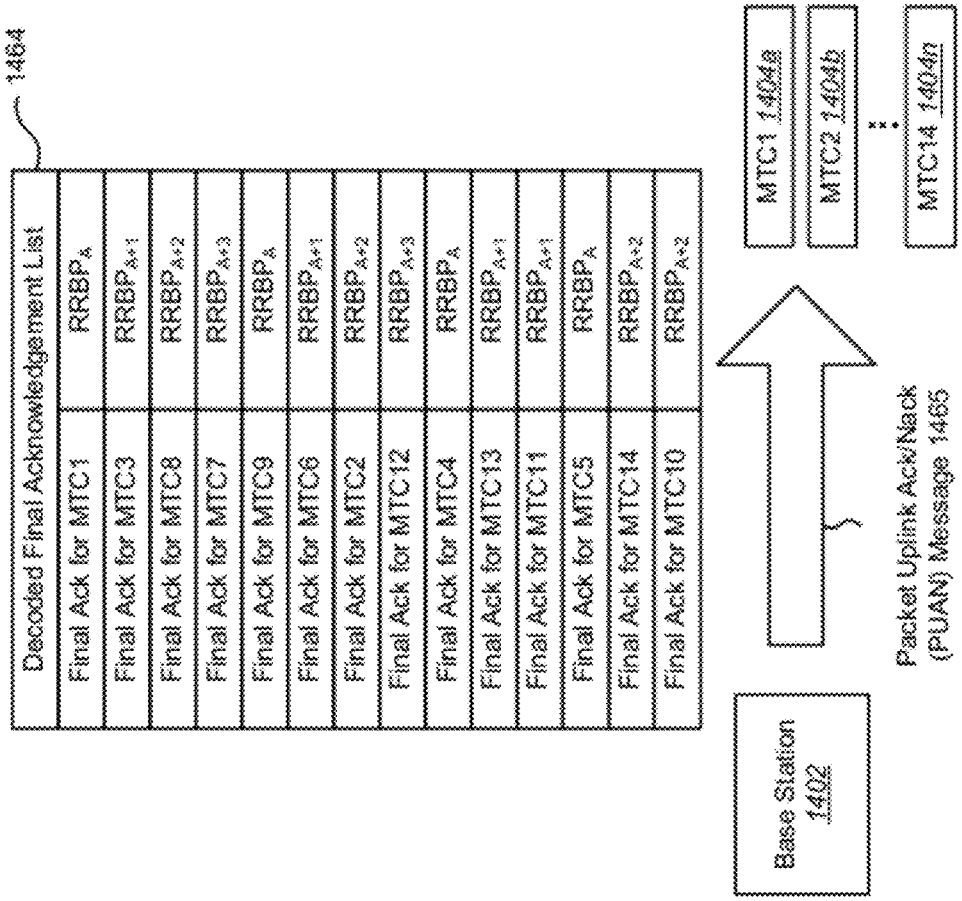
FIG. 14 is a block diagram illustrating the transmission of a decoded final acknowledgement list from a base station to multiple machine type communication (MTC) devices.

FIG. 14 is a block diagram illustrating the transmission of a decoded final acknowledgement list 1464 from a base station 1402 to multiple machine type communication (MTC) devices 1404a-n. The decoded final acknowledgement list 1464 may confirm that the RLC data blocks from each machine type communication (MTC) device 1404 have been successfully received by the base station 1402. The decoded final acknowledgement list 1464 may be transmitted using a Packet Uplink Ack/Nack (PUAN) message 1465 for fourteen machine type communication (MTC) devices 1404 (i.e., MTC1-MTC14 1404a-n).

The acknowledgement for each machine type communication (MTC) device 1404 is associated with a particular relative reserved block period (RRBP) 1290. For example, $RRBP_{A+1}$ has been allocated to an acknowledgement group that includes MTC3, MTC6, MTC16 and MTC11.

The order of the acknowledgements within the decoded final acknowledgement list 1464 may be used by each machine type communication (MTC) device 1404 to determine the particular frame within which it should transmit its device acknowledgment message. More particularly, within the decoded final acknowledgement list 1464, the machine type communication (MTC) devices 1404 that are allocated a particular relative reserved block period (RRBP) 1290 form an acknowledgement group associated with that relative reserved block period (RRBP) 1290. The listing order of the machine type communication (MTC) devices 1404 of an acknowledgement group determines the frames of the relative reserved block period (RRBP) 1290 associated with that acknowledgement group within which the machine type communication (MTC) devices 1404 in the acknowledgement group should transmit their respective device acknowledgement messages. This is discussed in additional detail below in relation to FIGS. 19-22.

The order in which the device acknowledgement messages are sent is based on each machine type communication (MTC) device's 1404 position within its acknowledgement group and the position of the group's associated relative reserved block period (RRBP) 1290 relative to other relative reserved block periods (RRBPs) 1290, rather than, for example, an alphabetic or numeric sequence based on the machine type communication (MTC) device 1404 address.

For practical reasons, the relative reserved block periods (RRBPs) 1290 allocated to the machine type communication (MTC) devices 1404 will likely be sequential and implicit in the ordered list of machine type communication (MTC) devices 1404, as shown in the first eight entries of the decoded final acknowledgement list 1464. Furthermore, it would be practical to list the machine type communication (MTC) devices 1404 in numerical order (MTC1, MTC2, MTC3. etc.) in the decoded final acknowledgement list 1464. With minor modifications, non-sequential relative reserved block periods (RRBPs) 1290 can be used instead. "Non-sequential" can mean fixed (such as by way of a predetermined set of relative reserved block period (RRBP) 1290 offsets) or variable (in the sense of identifying an explicit relative reserved block period (RRBP) 1290 or a relative reserved block period (RRBP) 1290 offset in the Packet Uplink Ack/Nack (PUAN) message 1465). If the relative reserved block period (RRBP) 1290 is variable, specifying the relative reserved block period (RRBP) 1290 or offset will use more bits in the Packet Uplink Ack/Nack (PUAN) message 1465, which may reduce the number of machine type communication (MTC) devices 1404 that can be addressed.

Figure 15:
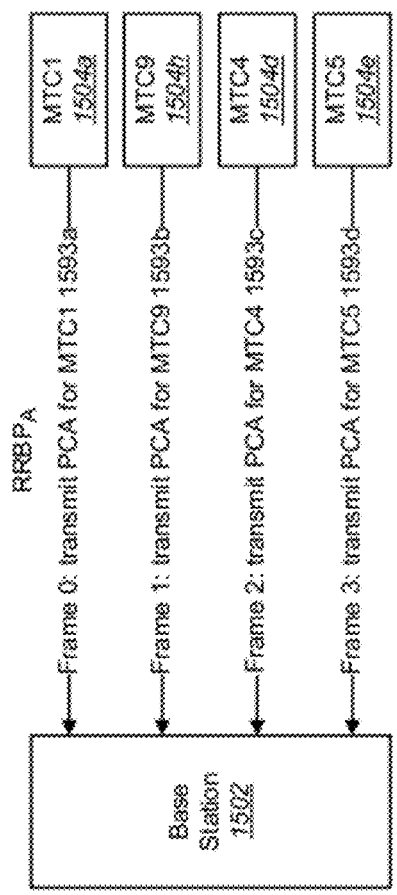
FIG. 15 is a block diagram illustrating the transmission of device acknowledgement messages from multiple machine type communication (MTC) devices to a base station for a first relative reserved block period (RRBP) $RRBP_A$.

FIG. 15 is a block diagram illustrating the transmission of device acknowledgement messages from multiple machine type communication (MTC) devices 1504*a*, 1504*h*, 1504*d*, 1504*e* to a base station 1502 for a first relative reserved block period (RRBP) 1290 $RRBP_A$. The device acknowledgements may be transmitted as packet control acknowledgements (PCAs) 1593*a*-*d*. During Frame 0 of the $RRBP_A$, MTC1 1504*a* may transmit a packet control acknowledgement (PCA) 1593*a* to the base station 1502. During Frame 1 of the $RRBP_A$, MTC9 1504*h* may transmit a packet control acknowledgement (PCA) 1593*b* to the base station 1502. During Frame 2 of the $RBBP_A$, MTC4 1504*d* may transmit a packet control acknowledgement (PCA) 1593*c* to the base station 1502. During Frame 3 of the $RBBP_A$, MTC5 1504*e* may transmit a packet control acknowledgement (PCA) 1593*d* to the base station 1502.

Figure 16:
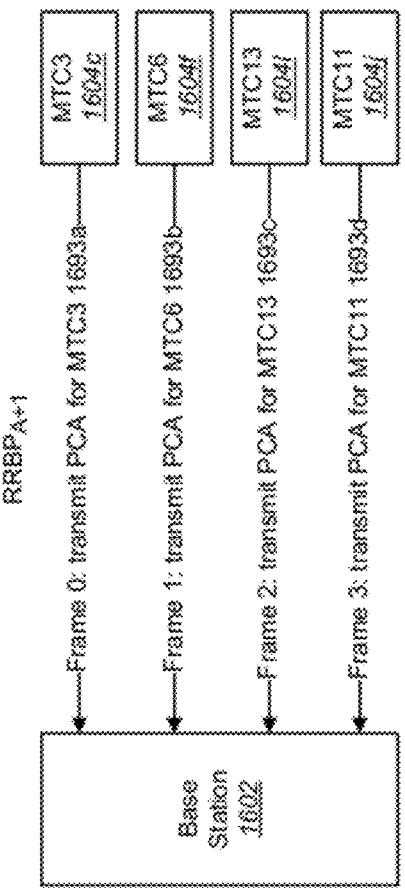
FIG. 16 is a block diagram illustrating the transmission of device acknowledgement messages from multiple machine type communication (MTC) devices to a base station for a second relative reserved block period (RRBP) $RRBP_{A+1}$.

FIG. 16 is a block diagram illustrating the transmission of device acknowledgement messages from multiple machine type communication (MTC) devices 1604*c*, 1604*f*, 1604*l*, 1604*j* to a base station 1602 for a second relative reserved block period (RRBP) 1290 $RRBP_{A+1}$. The device acknowledgements may be transmitted as packet control acknowledgements (PCAs) 1693*a*-*d*. During Frame 0 of the $RRBP_{A+1}$, MTC3 1604*c* may transmit a packet control acknowledgement (PCA) 1693*a* to the base station 1602. During Frame 1 of the $RRBP_{A+1}$, MTC6 1604*f* may transmit a packet control acknowledgement (PCA) 1693*b* to the base station 1602. During Frame 2 of the $RRBP_{A+1}$, MTC13 1604*l* may transmit a packet control acknowledgement (PCA) 1693*c* to the base station 1602. During Frame 3 of the $RRBP_{A+1}$, MTC11 1604*j* may transmit a packet control acknowledgement (PCA) 1693*d* to the base station 1602.

Figure 17:
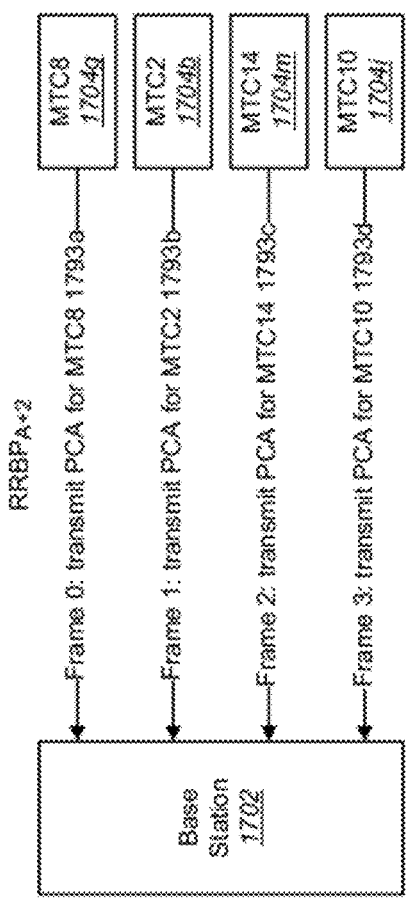
FIG. 17 is a block diagram illustrating the transmission of device acknowledgement messages from multiple machine type communication (MTC) devices to a base station for a third relative reserved block period (RRBP) $RRBP_{A+2}$.

FIG. 17 is a block diagram illustrating the transmission of device acknowledgement messages from multiple machine type communication (MTC) devices 1704*g*, 1704*b*, 1704*m*, 1704*i* to a base station 1702 for a third relative reserved block period (RRBP) 1290 $RRBP_{A+2}$. The device acknowledgements may be transmitted as packet control acknowledgements (PCAs) 1793*a*-*d*. During Frame 0 of the $RRBP_{A+2}$, MTC8 1704*g* may transmit a packet control acknowledgement (PCA) 1793*a* to the base station 1702. During Frame 1 of the $RRBP_{A+2}$, MTC2 1704*b* may transmit a packet control acknowledgement (PCA) 1793*b* to the base station 1702. During Frame 2 of the $RRBP_{A+2}$, MTC14 1704*m* may transmit a packet control acknowledgement (PCA) 1793*c* to the base station 1702. During Frame 3 of the $RRBP_{A+2}$, MTC10 1704*i* may transmit a packet control acknowledgement (PCA) 1793*d* to the base station 1702.

Figure 18:
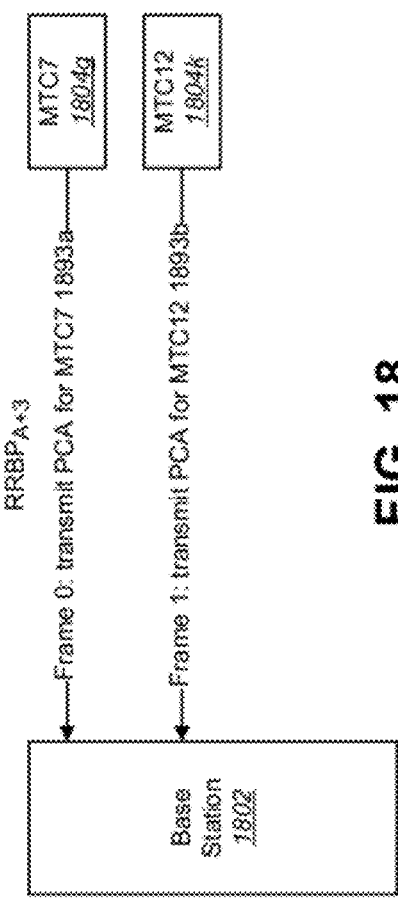
FIG. 18 is a block diagram illustrating the transmission of device acknowledgement messages from multiple machine type communication (MTC) devices to a base station for a fourth relative reserved block period (RRBP) $RRBP_{A+3}$.

FIG. 18 is a block diagram illustrating the transmission of device acknowledgement messages from multiple machine type communication (MTC) devices 1804*g*, 1804*k* to a base station 1802 for a fourth relative reserved block period (RRBP) 1290 $RRBP_{A+3}$. The device acknowledgements may be transmitted as packet control acknowledgements (PCAs) 1893*a*-*b*. During Frame 0 of the $RRBP_{A+3}$, MTC7 1804*g* may transmit a packet control acknowledgement (PCA) 1893*a* to the base station 1802. During Frame 1 of the $RRBP_{A+3}$, MTC12 1804*k* may transmit a packet control acknowledgement (PCA) 1893*b* to the base station 1802.

Figure 19:
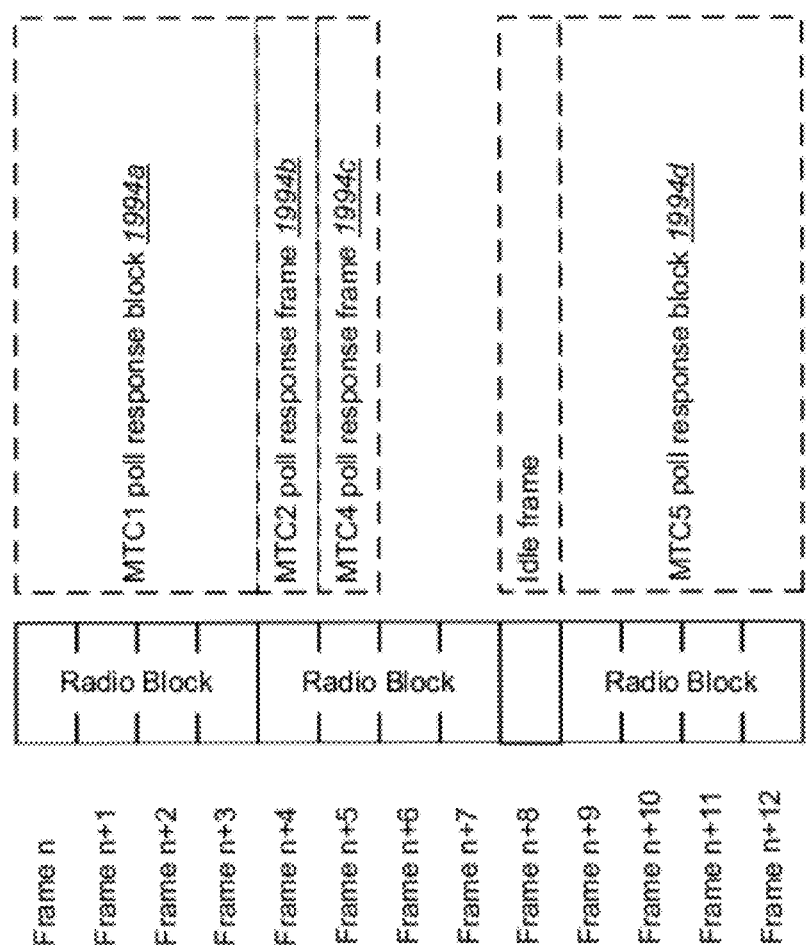
FIG. 19 is a block diagram illustrating the transmission of device acknowledgement messages by multiple wireless communication devices using a first coding option.

FIG. 19 is a block diagram illustrating the transmission of device acknowledgement messages by multiple wireless communication devices 104 using a first coding option. There are a number of ways in which a Packet Uplink Ack/Nack (PUAN) message 1465 from the network can indicate, to any addressed wireless communication devices 104, the particular relative reserved block period(s) (RRBPs) 1290 and/or burst(s) within which a Packet Control Acknowledgement (PCA) in reply should be transmitted. One example of a Packet Uplink Ack/Nack (PUAN) message 1465 (Coding option 1) is shown in the following sample code. New code (relative to the standard code) is highlighted in bold text.

```
Coding option 1:
< Packet Uplink Ack/Nack message content > ::=
    < PAGE MODE : bit (2) >
    {   00 < UPLINK_TFI : bit (5) >
        { 0     -- Message escape
            {   < CHANNEL_CODING_COMMAND : bit (2) >
                < Ack/Nack Description : < Ack/Nack Description IE > >
                { 0 | 1 < CONTENTION_RESOLUTION_TLLI : bit (32) > }
                { 0 | 1 < Packet Timing Advance : < Packet Timing Advance IE > > }
                { 0 | 1 < Power Control Parameters : < Power Control Parameters IE > > }
                { 0 | 1 < Extension Bits : Extension Bits IE > }        -- sub-clause 12.26
                0           -- The value '1' was allocated in an earlier version of the protocol
and shall not be used.
                {   null | 0 bit** = < no string >        -- Receiver backward compatible with
earlier version
                    | 1                     -- Additions for R99
                    { 0 | 1 <Packet Extended Timing Advance : bit (2) >}
                    < TBF_EST : bit (1)>
                    {   null | 0 bit** = <no string>   -- Receiver backward compatible with
earlier version
                        | 1                     -- Additions for Rel-5
                        { 0 | 1 < CONTENTION_RESOLUTION Identifier extension : bit (4)
>}
                        { 0 | 1 < RB Id : bit (5) > }
                        < padding bits >
                    }
                }
            }
```

```
                    ! < Non-distribution part error : bit (*) = < no string > >
                }
            | 1 -- Message escape bit used to define EGPRS message contents
                { 00
                    {   < EGPRS Channel Coding Command : < EGPRS Modulation and Coding
Scheme IE > >
                        < RESEGMENT : bit (1) >
                        < PRE_EMPTIVE_TRANSMISSION : bit (1) >
                        < PRR RETRANSMISSION REQUEST : bit (1) >
                        < ARAC RETRANSMISSION REQUEST : bit (1) >
                        { 0 | 1 < CONTENTION_RESOLUTION_TLLI : bit (32) > }
                        < TBF_EST : bit (1) >
                        { 0 | 1 < Packet Timing Advance : < Packet Timing Advance IE > > }
                        { 0 | 1 < Packet Extended Timing Advance : bit (2) > }
                        { 0 | 1 < Power Control Parameters : < Power Control Parameters IE > >
}
                        { 0 | 1 < Extension Bits : Extension Bits IE > }               --
sub-clause 12.26
                        {   < EGPRS Ack/Nack Description : < EGPRS Ack/Nack Description IE
> >
                            0        -- The value '1' was allocated in an earlier version of the
protocol and shall not be used.
                        } //
                        {   null | 0 bit** = <no string>    -- Receiver backward compatible with
earlier version
                            | 1                              -- Additions for Rel-5
                            { 0 | 1 < CONTENTION_RESOLUTION Identifier extension : bit (4)
> }
                        { 0 | 1 < RB Id : bit (5) > }
                        < padding bits > }
                    ! < Non-distribution part error : bit (*) = <no string> > }
            |01 --- Extension for multiple devices
                1 {
                        < UPLINK_TFI : bit (5) >
                        { 0 -- Final Ack
                            <RRBP : bit(4) >
                            0    - MS polled in for radio block using poll format defined by
                                         broadcast parameters
                            | 1 -- Send PCA in Access Burst format using a single burst
                        }
                        | 1 --- Not final ack so need to add additional information such as SSN
etc
                        {
                            { 0 -- MS not polled
                                | 1     { <RRBP: bit(4)>             -- MS polled
                                            0-- Send PCA in one Radio Block in format as
defined by broadcast parameter
                                            | 1     —Send PCA in Access Burst format using a
                                single burst.
                                    }
                            }
                            0 { - GPRS Ack/Nack
                                < CHANNEL_CODING_COMMAND : bit (2) >
                                    < GPRS_STARTING_SEQUENCE_NUMBER : bit (7)
>
                                <Length of bit Map : bit(6)>
                                < RECEIVED_BLOCK_BITMAP : bit ( Val(Length of bitmap
) ) >
                            }
                            | 1 { -- EGPRS Ack/Nack
                                    ; PPR Retransmission is assumed to be default which is
cycle through all pending Ack blocks
                                    < PRR RETRANSMISSION REQUEST : bit (1) >
                                    < ARAC RETRANSMISSION REQUEST : bit (1) >
                                        < EGPRS Channel Coding Command : <
EGPRS Modulation and Coding Scheme IE >>
                                        < BEGINNING_OF_WINDOW : bit (1) >
                                        < END_OF_WINDOW : bit (1) >
                                        <
EGPRS_STARTING_SEQUENCE_NUMBER : bit (11) >
                                        <Length of bit Map :bit(7))>
                                        < RECEIVED_BLOCK_BITMAP : bit (
Val(Length of bitmap )) >
                                }
                            }** 0;       Repeated as many times as necessary, limited by the space in
                            the message
                    }
                    ! < Message escape : { 10 | 11 } bit (*) = <no string> > } } -- Extended for
future changes
```

```
! < Address information part error : bit (*) = <no string> > }
! < Distribution part error : bit (*) = <no string> > ;
End coding option 1
```

In coding option 1, a Packet Uplink Ack/Nack (PUAN) message 1465 indicates that each addressed mobile communication device 104 should send a poll response in the form of a Packet Control Acknowledgement (PCA) in a particular radio block relative to the radio block in which the Packet Uplink Ack/Nack (PUAN) message 1465 was received. The Packet Uplink Ack/Nack (PUAN) message 1465 also indicates, for each wireless telecommunication device 104, whether the packet control acknowledgement (PCA) is to be sent as a radio block or as a single burst within the indicated radio block The absolute frame number is calculated based on the relative reserved block period (RRBP) 1290 using Table 1.

TABLE 1

| Relative Reserved Block Period (RRBP) | Absolute Frame Number |
|---|---|
| 0000 | (N + 13) mod 2715648 |
| 0001 | (N + 17 or N + 18) mod 2715648 |
| 0010 | (N + 21 or N + 22) mod 2715648 |
| 0011 | (N + 26) mod 2715648 |
| 0100 | (N + 30 or N + 31) mod 2715648 |
| 0101 | (N + 34 or N + 35) mod 2715648 |
| 0110 | (N + 39) mod 2715648 |
| 0111 | (N + 43 or N + 44) mod 2715648 |
| 1000 | (N + 47 or N + 48) mod 2715648 |
| 1001 | (N + 52) mod 2715648 |
| 1010 | (N + 56 or N + 57) mod 2715648 |
| 1011 | (N + 60 or N + 61) mod 2715648 |
| 1100 | (N + 65) mod 2715648 |
| 1101 | (N + 69 or N + 70) mod 2715648 |
| 1110 | (N + 73 or N + 74) mod 2715648 |
| 1111 | (N + 78) mod 2715648 |

A particular wireless communication device 104 determines the starting frame number within which it should transmit its packet control acknowledgement (PCA) message using Equation (1):

$$\text{Starting Frame Number} = \text{FNPUAN} + [\text{RRBP}] + [\text{Frames Used}]. \quad (1)$$

In Equation (1), $FN_{PUAN}$ is the relative reserved block period (RRBP) 1290 within which the Packet Uplink Ack/Nack (PUAN) message 1465 was transmitted. Also in Equation (1), [RRBP] is the number of radio blocks to add to $FN_{PUAN}$, converted to frame numbers and taking into account any idle frame(s). In one configuration, the number of radio blocks to add is indicated by a 2-bit value. Furthermore, in Equation (1) [Frames Used] is the total number of frames that will be used by other wireless communication devices 104 addressed earlier within the same Packet Uplink Ack/Nack (PUAN) message 1465 and instructed to send an acknowledgement in the same relative reserved block period (RRBP) 1290 as the wireless communication device 104 performing the determination. This number will calculated by each wireless communication device 104 upon receipt and decoding of the Packet Uplink Ack/Nack (PUAN) message 1465.

In one configuration, a machine type communication (MTC) device 1104 can be instructed to transmit its device acknowledgement as two (consecutive) access bursts. This is discussed in additional detail below in relation to FIG. 21 and FIG. 22. By transmitting the device acknowledgement as two (consecutive) access bursts, redundancy is increased, thereby reducing capacity compared to a single access burst. However, performance is improved compared to legacy (Normal Burst or Access Burst mode) behavior. The relative reserved block period (RBRP) acknowledgement message 1163 from the base station 1102 may indicate whether each machine type communication (MTC) device 1104 is to transmit its device acknowledgement in access burst format using 1 burst, 2 bursts or 4 bursts (4 bursts corresponding to one form of legacy behavior).

For FIG. 19, the Packet Uplink Ack/Nack (PUAN) message 1465 may include an ordered list of addressed wireless communication devices 104. MTC1 1404a may be polled for a radio block with [RRBP]=0, MTC2 1404b may be polled for one burst with [RRBP]=1, MTC3 1404c may not be polled, MTC4 1404d may be polled for one burst with [RRBP]=1 and MTC5 1405e may be polled for one radio block with [RRBP]=2. MTC1 1404a may be instructed to send a packet control acknowledgement (PCA) as a full radio block with [$FN_{PUAN}$]=0. Thus, MTC1 1404a may transmit a device acknowledgement message during Frame n through Frame n+3 (referred to as MTC1 poll response block 1994a). This operation is consistent with the relevant 3GPP standards.

MTC2 1404b may be next in the ordered list of the Packet Uplink Ack/Nack (PUAN) message 1465. MTC2 1404b may be instructed to transmit the packet control acknowledgement (PCA) message as a single access burst with [RRBP]=1. Therefore, MTC2 1404b may transmit a device acknowledgement message during Frame n+4 (referred to as MTC2 poll response frame 1994b), which is the first available frame of the radio block offset by 1 from the radio block following $FN_{PUAN}$.

MTC4 1404d may be next in the ordered list of the Packet Uplink Ack/Nack (PUAN) message 1465 (because MTC2 1404b is higher than MTC4 1404d in the ordered list 1464). MTC4 1404d may be also instructed to transmit the packet control acknowledgement (PCA) message as a single access burst with [RRBP]=1. Therefore, MTC4 1404d may transmit a device acknowledgement message during Frame n+5 (referred to as MTC4 poll response frame 1994c), which is the first frame available after MTC2 1404b transmits a packet control acknowledgement (PCA) message in Frame n+4.

MTC5 1404e may determine that it is to transmit a packet control acknowledgement (PCA) message as a full radio block with [RRBP]=2. Although there are two free frames (i.e., Frame n+6 and Frame n+7) in the second half of the radio block, the transmission of a packet control acknowledgement (PCA) message using four frames may require an entire radio block if the packet control acknowledgement (PCA) message is not to be distributed across different radio blocks. While distributing a packet control acknowledgement (PCA) message across different radio blocks is technically possible, there are practical reasons for preferring that where more than one frame is required for a packet control acknowledgement (PCA) message, the frames should be in the same radio block. Thus, MTC5 104e may transmit a device acknowledgement message during Frame n+9 through Frame n+12 (referred to as MTC5 poll response block 1994d). An idle frame may occur during Frame n+8.

Figure 20:
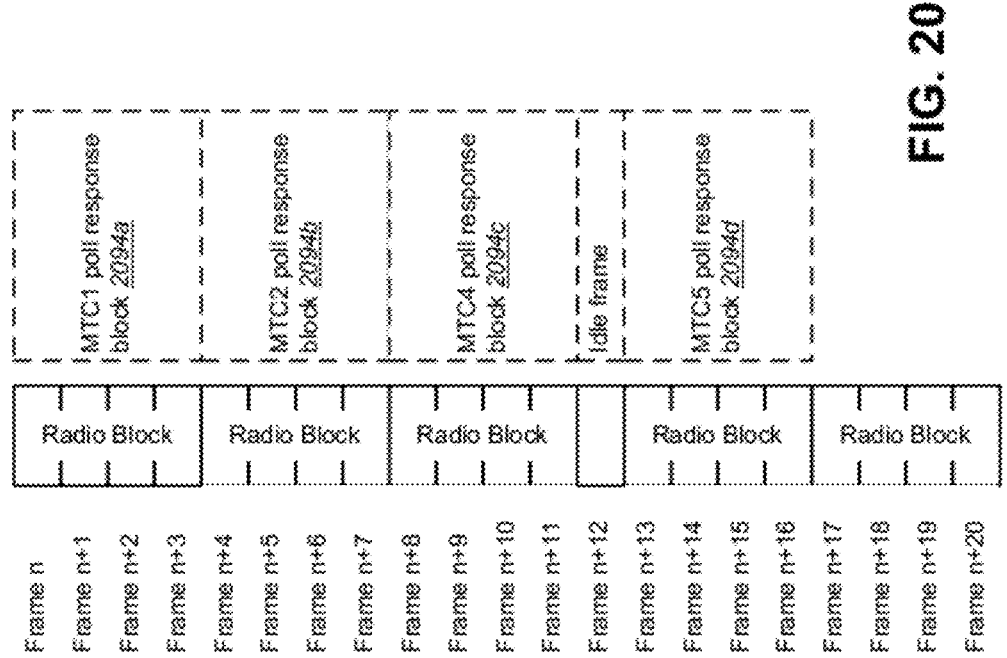
FIG. 20 illustrates the transmission of device acknowledgement messages by multiple wireless communication devices using a second coding option.

FIG. 20 illustrates the transmission of device acknowledgement messages by multiple wireless communication devices 104 using a second coding option. Another example of a Packet Uplink Ack/Nack (PUAN) message 1465 (Coding option 2) is shown in the following sample code. New code (relative to the standard code) is highlighted in bold text.

```
Coding option 2:
< Packet Uplink Ack/Nack message content > ::=
    < PAGE MODE : bit (2) >
    {  00 < UPLINK_TFI : bit (5) >
        { 0        -- Message escape
            {  < CHANNEL_CODING_COMMAND : bit (2) >
                < Ack/Nack Description : < Ack/Nack Description IE > >
                { 0 | 1 < CONTENTION_RESOLUTION_TLLI : bit (32) > }
                { 0 | 1 < Packet Timing Advance : < Packet Timing Advance IE > > }
                { 0 | 1 < Power Control Parameters : < Power Control Parameters IE > > }
                { 0 | 1 < Extension Bits : Extension Bits IE > }       -- sub-clause 12.26
                0          -- The value '1' was allocated in an earlier version of the protocol
and shall not be used.
                {  null | 0 bit** = < no string >      -- Receiver backward compatible with
earlier version
                   | 1                  -- Additions for R99
                   { 0 | 1 <Packet Extended Timing Advance : bit (2) >}
                   < TBF_EST : bit (1)>
                   {  null | 0 bit** = <no string>   -- Receiver backward compatible with
earlier version
                      | 1                              -- Additions for Rel-5
                      { 0 | 1 < CONTENTION_RESOLUTION Identifier extension : bit (4)
> }
                      { 0 | 1 < RB Id : bit (5) > }
                      < padding bits >
                   }
                }
                ! < Non-distribution part error : bit (*) = < no string > >
            }
        | 1 -- Message escape bit used to define EGPRS message contents
            { 00
                {  < EGPRS Channel Coding Command : < EGPRS Modulation and Coding
Scheme IE >>
                   < RESEGMENT : bit (1) >
                   < PRE_EMPTIVE_TRANSMISSION : bit (1) >
                   < PRR RETRANSMISSION REQUEST : bit (1) >
                   < ARAC RETRANSMISSION REQUEST : bit (1) >
                   {0 | 1 < CONTENTION_RESOLUTION_TLLI : bit (32) > }
                   < TBF_EST : bit (1) >
                   { 0 | 1 < Packet Timing Advance : < Packet Timing Advance IE > > }
                   { 0 | 1 < Packet Extended Timing Advance : bit (2) > }
                   { 0 | 1 < Power Control Parameters : < Power Control Parameters IE > >
}
                   { 0 | 1 < Extension Bits : Extension Bits IE > }                      --
sub-clause 12.26
                   {  < EGPRS Ack/Nack Description : < EGPRS Ack/Nack Description IE
> >
                      0    -- The value '1' was allocated in an earlier version of the
protocol and shall not be used.
                   } //
                   {  null | 0 bit** = <no string>   -- Receiver backward compatible with
earlier version
                      | 1                              -- Additions for Rel-5
                      { 0 | 1 < CONTENTION_RESOLUTION Identifier extension : bit (4)
> }
                      { 0 | 1 < RB Id : bit (5) > }
                      < padding bits > }
                   ! < Non-distribution part error : bit (*) = <no string> > }
        |01 --- Extension for multiple devices
                1 {
                      < UPLINK_TFI : bit (5) >
                    { 0 -- Final Ack
                        0   -- MS polled in for radio block using poll format defined by
broadcast parameters
                        | 1 -- Send PCA in Access Burst format using one or two Access
                        burst(s)
                          < Num of Access Bursts :bit(1)>
                    }
                    | 1 --- Not final ack so need to add additional information such as SSN
etc
                        {
                         {  0- MS is not polled
                           | 1 - MS is polled
                            {   0-- Send PCA in one Radio Block in format as defined by
                        broadcast parameter
```

```
                    | 1    —Send PCA in Access Burst format using a single
         burst.
                         < Num of Access Bursts :bit(1) >
                   }
                }
                  0 { - GPRS Ack/Nack
                         < CHANNEL_CODING_COMMAND : bit (2) >
                              < GPRS_STARTING_SEQUENCE_NUMBER : bit (7)
>
                         <Length of bit Map : bit(6)>
                         < RECEIVED_BLOCK_BITMAP : bit ( Val(Length of bitmap
) ) >
                         }
                  | 1 { -- EGPRS Ack/Nack
                              ; PPR Retransmission is assumed to be default which is
cycle through all pending Ack blocks
                              < PRR RETRANSMISSION REQUEST : bit (1) >
                              < ARAC RETRANSMISSION REQUEST : bit (1) >
                              < EGPRS Channel Coding Command : <
EGPRS Modulation and Coding Scheme IE >>
                              < BEGINNING_OF_WINDOW : bit (1) >
                              < END_OF_WINDOW : bit (1) >
                              <
EGPRS_STARTING_SEQUENCE_NUMBER : bit (11) >
                              <Length of bit Map :bit(7))>
                              < RECEIVED_BLOCK_BITMAP : bit (
Val(Length of bitmap )) >
                         }
                  }** 0;        Repeated as many times as necessary, limited by the space in
                     the message
             }
                  ! < Message escape : { 10 | 11 } bit (*) = <no string> > } } -- Extended for
future changes
                  ! < Address information part error : bit (*) = <no string> > }
! < Distribution part error : bit (*) = <no string> > ;
End coding option 2
```

In coding option 2, "Num of Access Bursts: bit(1)" is interpreted as follows: 0—wireless communication device to send acknowledgement as one Access Burst, 1—wireless communication device to send acknowledgement as two consecutive Access Bursts.

Using coding option 2, the starting frame within which a device acknowledgement (in the form of a Packet Control Acknowledgement (PCA) message) is to be sent is calculated using Equation (2):

$$\text{Starting Frame Number} = FN_{PUAN} + [\text{base RRBP}] + [\text{Frames Used}] + [\text{Idle Frames}] + [\text{Alignment}]. \quad (2)$$

In Equation (2), $FN_{PUAN}$ is the frame number of the first frame of the radio block containing the acknowledgement message (PUAN) transmitted by the base station 1402. Also, in Equation (2), [base RRBP] is common to all addressed devices and is the number of frames to add to $FN_{PUAN}$. In Equation (2), [base RRBP] is defined in the MAC header. Preferably, the number of frames is determined by converting an indicated number of radio blocks. In this example, the number of radio blocks to add is indicated by a 2-bit value.

In Equation (2), [Frames Used] is the total number of frames that will be used by other wireless communication devices 104 addressed earlier within the same Packet Uplink Ack/Nack (PUAN) message 1465 and instructed to send an acknowledgement. This number is calculated by each wireless communication device 104 upon receipt and decoding of the Packet Uplink Ack/Nack (PUAN) message 1465. Also, in Equation (2), [Idle frames] is an adjustment to account for idle frames within which the mobile communication devices 104 cannot transmit. In Equation (2), [Alignment] is an adjustment to ensure the first frame of a radio block within which the first wireless communication device 104 transmits its acknowledgement is aligned with the first frame of a relative reserved block period (RRBP) 1290. For example, a message requiring four frames is aligned with the first frame of a radio block, whereas a message requiring only two frames is aligned with the third frame of a radio block. Such alignment assures that a message does not occupy more than one radio block.

The precise calculations may vary slightly depending on the preferred implementation. The relative reserved block period (RRBP) 1290 is sent in every RLC/MAC radio block. The E/SP bit is ignored. (See 3GPP TS 44.060 section 10.4.5 for additional details).

Figure 21:
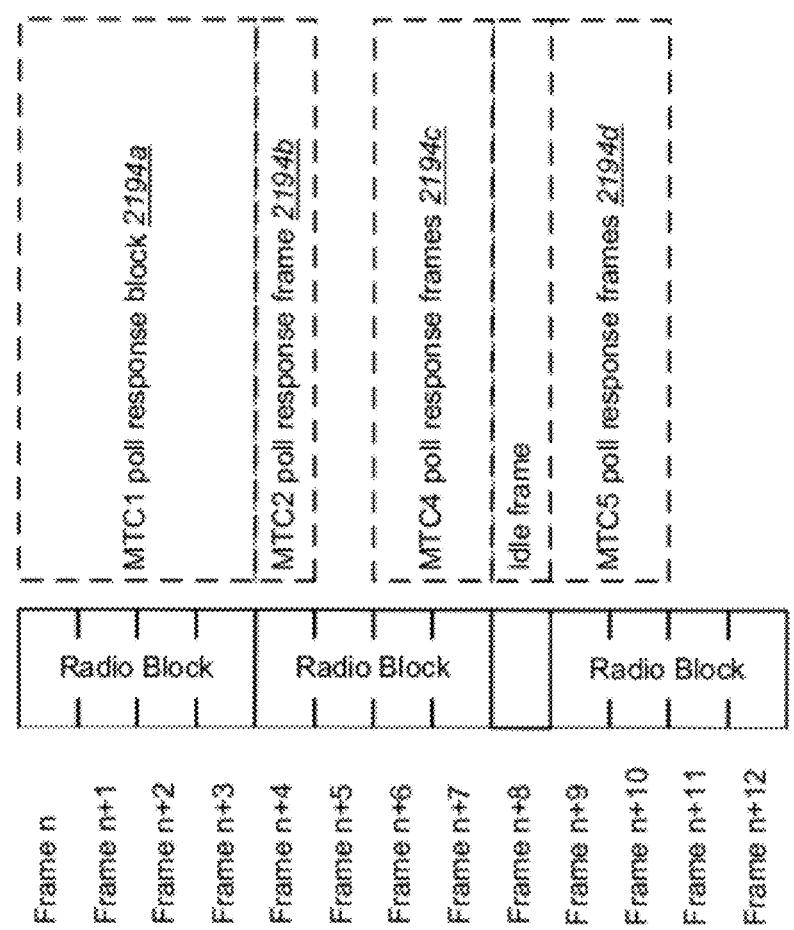
FIG. 21 is another block diagram illustrating the transmission of device acknowledgement messages by multiple wireless communication devices using the second coding option.
Figure 22:
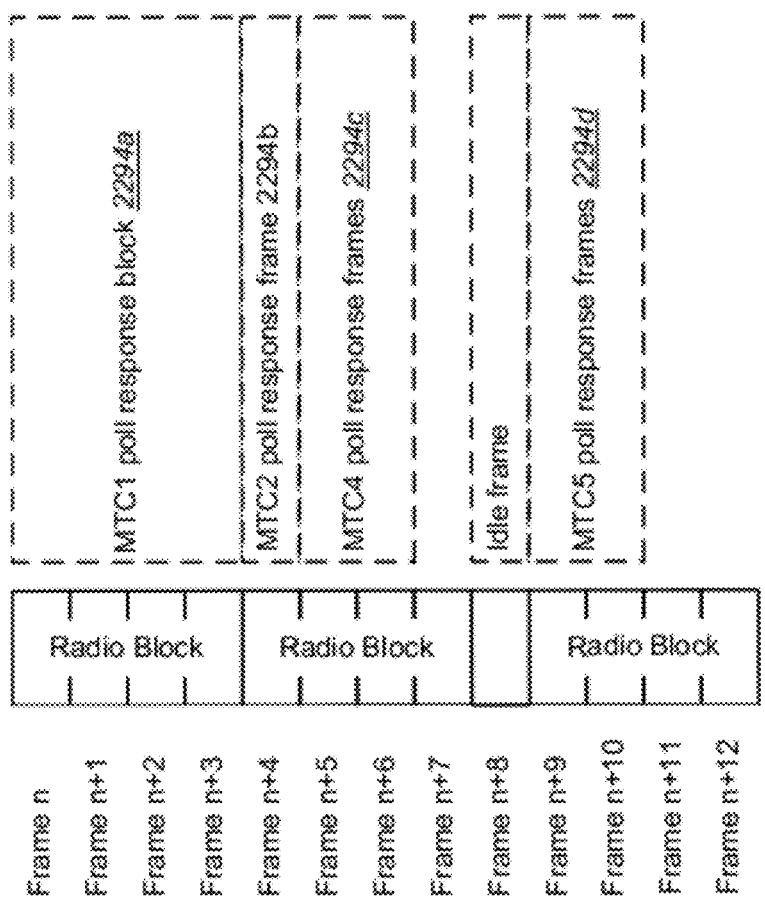
FIG. 22 is yet another block diagram illustrating the transmission of device acknowledgement messages by multiple wireless communication devices using the second coding option.

FIGS. 20-22 illustrate examples of coding option 2 in use. The examples explain how the Packet Uplink Ack/Nack (PUAN) message 1465 can instruct the addressed wireless communication devices 104 to send their Packet Control Acknowledgements (PCAs).

In the example illustrated by FIG. 20, the Packet Uplink Ack/Nack (PUAN) message 1465 indicates that all addressed wireless communication devices 104 are to respond with Packet Control Acknowledgement (PCA) messages in radio block format (that is, using all four frames/bursts of a relative reserved block period (RRBP) 1290) or four access bursts (that is, by sending the same packet control acknowledgement (PCA) message four times in successive frames within a relative reserved block period (RRBP) 1290). MTC1 1404a, MTC2 1404b, MTC4 1404d and MTC5 1405e are polled (while MTC3 1404c is not polled). This results in MTC1 1404a, MTC2 1404b, MTC4 1404d and MTC5 1404e transmitting responses in the form of device acknowledgements (such as packet control acknowledgement (PCA) messages), where each packet control acknowledgement (PCA) is transmitted in one of multiple consecutive radio blocks. MTC5 1404e may have to take account of the idle frame following the radio block when MTC4 104*d* transmits the device acknowledgement message. MTC1 1404*a*, MTC2 1404*b*, MTC4 1404*d* and MTC5 1404*e* may use the same base relative reserved block period (RRBP) 1290 to determine the frames in which they transmit their device acknowledgements.

MTC1 1404*a* may transmit a device acknowledgement message in Frame n through Frame n+3 (referred to as MTC1 poll response block 2094*a*). MTC2 1404*b* may transmit a device acknowledgement message in Frame n+4 through Frame n+7 (referred to as MTC2 poll response block 2094*b*). MTC4 1404*d* may transmit a device acknowledgement message in Frame n+8 through Frame n+11 (referred to as MTC4 poll response block 2094*c*). MTC5 1404*e* may transmit a device acknowledgement message in Frame n+13 through Frame n+16 (referred to as MTC5 poll response block 2094*d*).

FIG. 21 is another block diagram illustrating the transmission of device acknowledgement messages by multiple wireless communication devices 104 using the second coding option. In this example, the Packet Uplink Ack/Nack (PUAN) message 1465 indicates whether a Packet Control Acknowledgement (PCA) message from each addressed wireless communication device 104 should use all four frames of a radio block (i.e., be sent in normal burst mode or access burst mode that includes four repeated acknowledgements transmitted in sequential frames), or an access burst mode using one or two sequential access bursts.

For FIG. 21, MTC1 1404*a* is polled for a radio block, MTC2 1404*b* is polled for one burst, MTC3 1404*c* is not polled, MTC4 1404*d* is polled for two bursts and MTC5 1404*e* is polled for two bursts. MTC1 1404*a* may transmit a device acknowledgement message using the first radio block that includes Frame n through Frame n+3 (referred to as MTC1 poll response block 2194*a*). MTC2 1404*b* may transmit a device acknowledgement message using Frame n+4 (referred to as MTC2 poll response frame 2194*b*).

In general, if a particular Packet Uplink Ack/Nack (PUAN) message 1465 indicates that a wireless communication device 104 is to send a packet control acknowledgement (PCA) message in two access burst format, that packet control acknowledgement (PCA) message is to be sent in two consecutive bursts, within the same radio block. The frame in which the wireless communication device 104 begins its transmission is determined as described above. Two access bursts can be sent in either the first two frames or the last two frames of a radio block. In other words, if two access bursts are required, the wireless communication device 104 will not transmit them in the two central frames or those bridging adjacent radio blocks (that is, using the last access burst of one radio block and the first access burst of the second radio block). In FIG. 21, MTC4 1404*d* has been polled for two access bursts. Since MTC2 1404*b* was instructed to send its packet control acknowledgement (PCA) message using only a single access burst, and this single access burst was transmitted at the start of the radio block (i.e., in Frame n+4), the second frame (i.e., Frame n+5) of the radio block is left unused. MTC4 1404*d* may then transmit in the third and fourth frames of the radio block (i.e., Frame n+6 and Frame n+7) (referred to as MTC4 poll response frames 2194*c*).

Following the idle frame (Frame n+8), MTC5 1404*e* transmits a device acknowledgement message in the first two frames (Frame n+9 and Frame n+10) of the following radio block (referred to as MTC5 poll response frames 2194*d*). The reason for access bursts from one wireless communication device 104 being consecutive and either at the start or end of the radio block is to align sub-frame usage with the reduced transmit time interval (RTTI) scheme under the EDGE standard. Under the RTTI scheme, a sub-frame includes the first or last two frames of a radio block.

FIG. 22 is yet another block diagram illustrating the transmission of device acknowledgement messages by multiple wireless communication devices 104 using the second coding option. In the example illustrated in FIG. 22, all device acknowledgement messages to be transmitted in a particular radio block can be packed sequentially into that radio block. Under this scheme, any unused frames end up being positioned at the end of the radio block.

MTC1 1404*a* may transmit a device acknowledgement message using the first radio block that includes Frame n through Frame n+3 (referred to as MTC1 poll response block 2294*a*). MTC2 1404*b* may transmit a device acknowledgement message using Frame n+4 (referred to as MTC2 poll response frame 2294*b*). MTC4 1404*d* transmits its two-frame device acknowledgement message starting at Frame n+5 rather than waiting until Frame n+6. MTC4 1404*d* thus transmits during the MTC4 poll response frames 2294*c*. This leaves Frame n+7 unused at the end of the radio block.

If there is insufficient space within a particular radio block to carry all bursts representing a device acknowledgement message from a particular wireless communication device 104, then the bursts are moved to the following radio block (taking into account any intervening idle frame). Since the next device acknowledgement message (for MTC5 1404*e*) requires two frames, it cannot fit into the remaining frame of the radio block within which MTC2 1404*b* and MTC4 1404*d* transmitted their respective device acknowledgement messages. As such, MTC5 1404*e* transmits its device acknowledgement message starting with the first frame (Frame n+9) of the next radio block. Thus, MTC5 1404*e* transmits the device acknowledgement message during MTC5 poll response frames 2294*d*.

It will be appreciated by those skilled in the art that the specific schemes for transmitting packet control acknowledgements (PCAs) are only examples of what may be implemented. For example, while less desirable from a standards point of view, there is no logical reason that access bursts used for a particular device acknowledgement cannot span adjacent radio blocks.

It will also be understood that, since the timing and format of device acknowledgement messages is determined by the network, it is possible for the use of frames to be managed intelligently. For example, the radio blocks or frames not used for acknowledgements could be scheduled by the network for other uses, including uses unrelated to the transmission of device acknowledgement messages.

The advantage of the above-described embodiments is that they enable device acknowledgement messages to be transmitted from wireless communication devices 104 using fewer network resources (and signaling channels in particular) while also allowing earlier release of network resources for other purposes. In general, it will be up to the base station 102 and network to determine the situations in which the improved resource utilization offered by transmitting device acknowledgement messages from plural devices during a single relative reserved block period (RRBP) 1290 outweighs any other potential issues arising from the reduced data redundancy inherent in such a method.

It should be noted that, since machine type communication (MTC) devices are frequently static (in which case the channel characteristics between them and their associated base station 102 are well determined), always use the same base station 102, and often transmit bursty data, they theoretically have the most to gain from the described approach. That said, benefits may also apply when the method is applied in relation to other wireless communication devices 104 such as smartphones and the like, particularly when stationary or moving relatively slowly. It should therefore be noted that the present systems and methods is in no way restricted to applications involving machine type communication (MTC) devices, and can be applied to any form of wireless communication device 104.

For the most part, the decision to use one of the described methods will be made in the base station 102 or the network. The decision can be, for example, reactive to network conditions whether temporary or ongoing.

Figure 23:
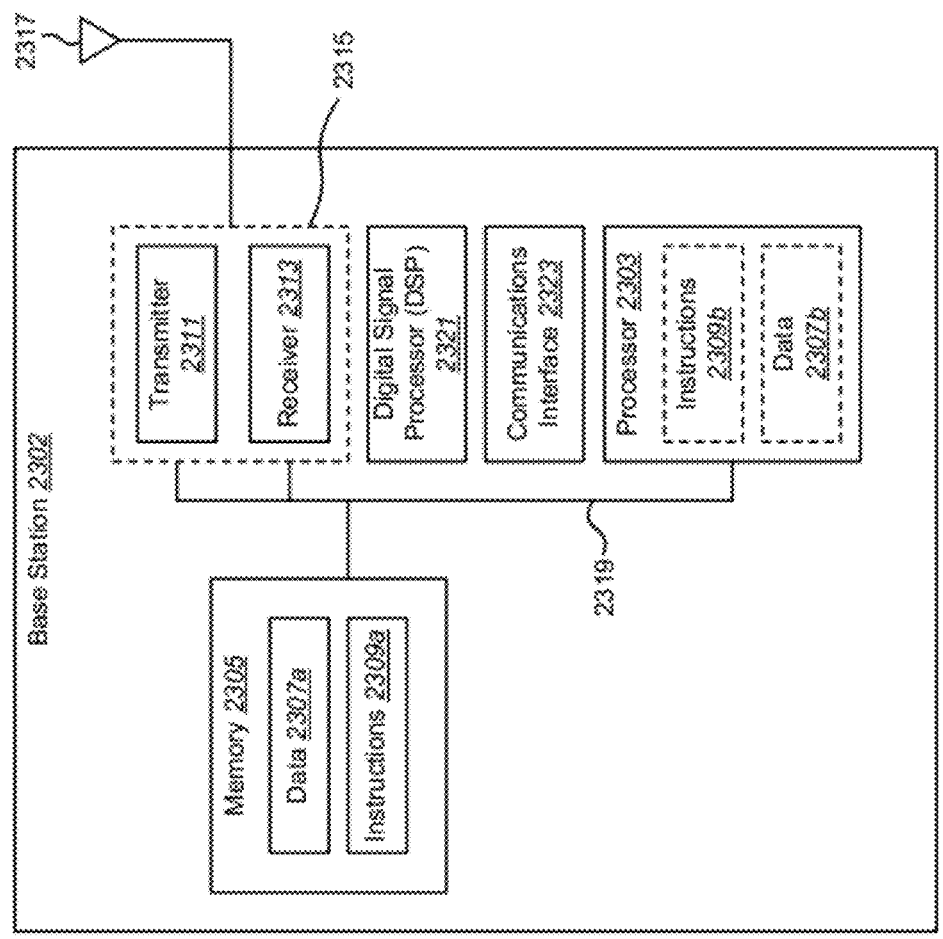
FIG. 23 illustrates certain components that may be included within a base station.

FIG. 23 illustrates certain components that may be included within a base station 2302. A base station 2302 may also be referred to as, and may include some or all of the functionality of, an access point, a broadcast transmitter, a NodeB, an evolved NodeB, etc. The base station 2302 includes a processor 2303. The processor 2303 may be a general purpose single- or multi-chip microprocessor (e.g., an ARM), a special purpose microprocessor (e.g., a digital signal processor (DSP)), a microcontroller, a programmable gate array, etc. The processor 2303 may be referred to as a central processing unit (CPU). Although just a single processor 2303 is shown in the base station 2302 of FIG. 23, in an alternative configuration, a combination of processors (e.g., an ARM and DSP) could be used.

The base station 2302 also includes memory 2305. The memory 2305 may be any electronic component capable of storing electronic information. The memory 2305 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 2307a and instructions 2309a may be stored in the memory 2305. The instructions 2309a may be executable by the processor 2303 to implement the methods disclosed herein. Executing the instructions 2309a may involve the use of the data 2307a that is stored in the memory 2305. When the processor 2303 executes the instructions 2309a, various portions of the instructions 2309b may be loaded onto the processor 2303, and various pieces of data 2307b may be loaded onto the processor 2303.

The base station 2302 may also include a transmitter 2311 and a receiver 2313 to allow transmission and reception of signals to and from the base station 2302. The transmitter 2311 and receiver 2313 may be collectively referred to as a transceiver 2315. An antenna 2317 may be electrically coupled to the transceiver 2315. The base station 2302 may also include (not shown) multiple transmitters, multiple receivers, multiple transceivers and/or additional antennas.

The base station 2302 may include a digital signal processor (DSP) 2321. The base station 2302 may also include a communications interface 2323. The communications interface 2323 may allow a user to interact with the base station 2302.

The various components of the base station 2302 may be coupled together by one or more buses, which may include a power bus, a control signal bus, a status signal bus, a data bus, etc. For the sake of clarity, the various buses are illustrated in FIG. 23 as a bus system 2319.

Figure 24:
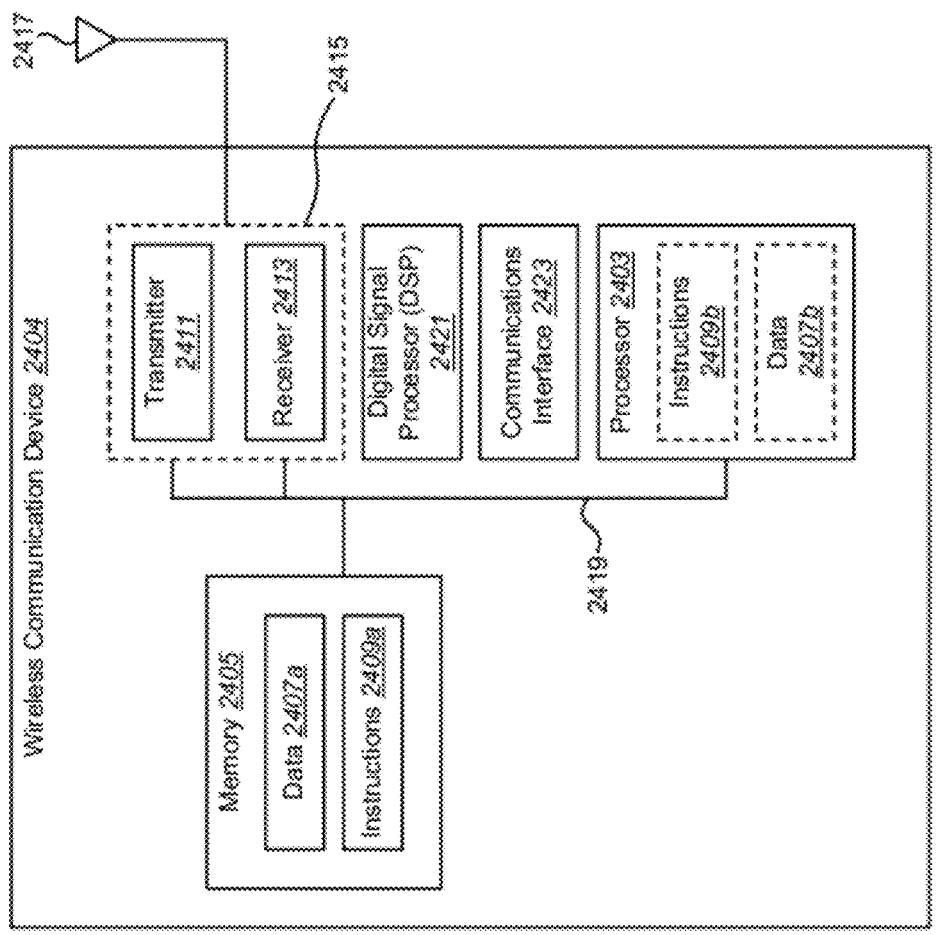
FIG. 24 illustrates certain components that may be included within a wireless communication device.

FIG. 24 illustrates certain components that may be included within a wireless communication device 2404. The wireless communication device 2404 may be an access terminal, a mobile station, a user equipment (UE), a machine type communication (MTC) device, etc. The wireless communication device 2404 includes a processor 2403. The processor 2403 may be a general purpose single- or multi-chip microprocessor (e.g., an ARM), a special purpose microprocessor (e.g., a digital signal processor (DSP)), a microcontroller, a programmable gate array, etc. The processor 2403 may be referred to as a central processing unit (CPU). Although just a single processor 2403 is shown in the wireless communication device 2404 of FIG. 24, in an alternative configuration, a combination of processors (e.g., an ARM and DSP) could be used.

The wireless communication device 2404 also includes memory 2405. The memory 2405 may be any electronic component capable of storing electronic information. The memory 2405 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 2407a and instructions 2409a may be stored in the memory 2405. The instructions 2409a may be executable by the processor 2403 to implement the methods disclosed herein. Executing the instructions 2409a may involve the use of the data 2407a that is stored in the memory 2405. When the processor 2403 executes the instructions 2409, various portions of the instructions 2409b may be loaded onto the processor 2403, and various pieces of data 2407b may be loaded onto the processor 2403.

The wireless communication device 2404 may also include a transmitter 2411 and a receiver 2413 to allow transmission and reception of signals to and from the wireless communication device 2404 via an antenna 2417. The transmitter 2411 and receiver 2413 may be collectively referred to as a transceiver 2415. The wireless communication device 2404 may also include (not shown) multiple transmitters, multiple antennas, multiple receivers and/or multiple transceivers.

The wireless communication device 2404 may include a digital signal processor (DSP) 2421. The wireless communication device 2404 may also include a communications interface 2423. The communications interface 2423 may allow a user to interact with the wireless communication device 2404.

The various components of the wireless communication device 2404 may be coupled together by one or more buses, which may include a power bus, a control signal bus, a status signal bus, a data bus, etc. For the sake of clarity, the various buses are illustrated in FIG. 24 as a bus system 2419.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 9, 10 and 12, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for receiving acknowledgements from plural wireless communication devices, the method comprising:
   receiving a radio link control message from at least one wireless communication device of the plural wireless communication devices;
   transmitting a base station acknowledgement message addressed to the plural wireless communication devices, the base station acknowledgement message indicating an acknowledgement group that comprises the plural wireless devices, wherein each wireless communication device of the acknowledgment group is allocated a period within a common time interval during which to transmit a device acknowledgement message, the base station acknowledgement message further indicating, for each wireless communication device of the acknowledgement group, whether all of a plurality of radio link control messages associated with each wireless communication device have been successfully received at a base station; and receiving from each wireless communication device of the acknowledgement group device acknowledgement messages each transmitted within the period of the common time interval indicated for each wireless communication device to transmit its device acknowledgement message.

2. The method of claim 1, further comprising generating the base station acknowledgement message in a form of a single acknowledgement message that addresses each of the plural wireless communication devices, wherein transmitting the base station acknowledgement message comprises transmitting the single acknowledgement message for receipt by the plural wireless communication devices.

3. The method of claim 2, wherein the single acknowledgement message comprises a list of addresses of the plural wireless communication devices addressed by the single acknowledgement message, wherein a relative position within the list of the addresses is indicative of the period within which that wireless communication device is to transmit its device acknowledgement message.

4. The method of claim 3, wherein an address of each wireless communication device in the list of addresses is a Temporary Flow Identifier (TFI).

5. The method of claim 1, wherein the base station acknowledgement message comprises ACK/NACK information for each addressed wireless communication device.

6. The method of claim 1, wherein the base station acknowledgment message indicates that device acknowledgement messages are to be transmitted by the plural wireless communication devices.

7. The method of claim 1, wherein the common time interval is a relative reserved block period that comprises one or more frames.

8. The method of claim 7, wherein the base station acknowledgement message indicates a first time interval in which the base station acknowledgement message was transmitted, and the base station acknowledgement message indicates a base relative reserved block period that is associated with all of the plural wireless communication devices and indicates a number of frames in addition to the one or more frames.

9. An apparatus for receiving acknowledgements from plural wireless communication devices, comprising:

means for receiving a radio link control message from at least one wireless communication device of the plural wireless communication devices;

means for transmitting a base station acknowledgement message addressed to the plural wireless communication devices, the base station acknowledgement message indicating an acknowledgement group that comprises the plural wireless devices, wherein each wireless communication device of the acknowledgment group is allocated a period within a common time interval during which to transmit a device acknowledgement message, the base station acknowledgement message further indicating, for each wireless communication device of the acknowledgement group, whether all of a plurality of radio link control messages associated with each wireless communication device have been successfully received at a base station; and means for receiving from each wireless communication device of the acknowledgement group device acknowledgement messages each transmitted within the period of the common time interval indicated for each wireless communication device to transmit its device acknowledgement message.

10. The apparatus of claim 9, further comprising means for generating the base station acknowledgement message in a form of a single acknowledgement message that addresses each of the plural wireless communication devices, wherein transmitting the base station acknowledgement message comprises transmitting the single acknowledgement message for receipt by the plural wireless communication devices.

11. The apparatus of claim 10, wherein the single acknowledgement message comprises a list of addresses of the plural wireless communication devices addressed by the single acknowledgement message, wherein a relative position within the list of addresses is indicative of the period within which that wireless communication device is to transmit its device acknowledgement message.

12. The apparatus of claim 11, wherein an address of each wireless communication device in the list of addresses is a Temporary Flow Identifier (TFI).

13. The apparatus of claim 9, wherein the base station acknowledgement message comprises ACK/NACK information for each addressed wireless communication device.

14. The apparatus of claim 9, wherein the base station acknowledgment message indicates that the device acknowledgement messages are to be transmitted by the plural wireless communication devices.

15. The apparatus of claim 9, wherein the common time interval is a relative reserved block period that comprises one or more frames.

16. The apparatus of claim 15, wherein the base station acknowledgement message indicates a first time interval in which the base station acknowledgement message was transmitted, and the base station acknowledgement message indicates a base relative reserved block period that is associated with all of the plural wireless communication devices and indicates a number of frames in addition to the one or more frames.

17. A computer-program product for receiving acknowledgements from plural wireless communication devices, the computer-program product comprising a non-transitory computer-readable medium having instructions thereon, the instructions comprising:

code for causing a base station to receive a radio link control message from at least one wireless communication device of the plural wireless communication devices;

code for causing the base station to transmit a base station acknowledgement message addressed to the plural wireless communication devices, the base station acknowledgement message indicating an acknowledgement group that comprises the plural wireless devices, wherein each wireless communication device of the acknowledgment group is allocated a period within a common time interval during which to transmit a device acknowledgement message, the base station acknowledgement message further indicating, for each wireless communication device of the acknowledgement group, whether all of a plurality of radio link control messages associated with each wireless communication device have been successfully received at a base station; and code for causing the base station to receive from each wireless communication device of the acknowledgement group device acknowledgement messages each transmitted within the period of the common time interval indicated for each wireless communication device to transmit its device acknowledgement message.

18. A method for transmitting a device acknowledgement from a wireless communication device, comprising:
transmitting a radio link control message to a base station;
receiving a base station acknowledgement message from the base station addressed to an acknowledgment group comprising plural wireless communication devices, wherein the base station acknowledgement message is received in response to the radio link control message transmitted from the wireless communication device, the base station acknowledgement message indicating, for each of the plural wireless communication devices, whether all of a plurality of radio link control messages associated with each wireless communication device have been successfully received at the base station, wherein each wireless communication device of the acknowledgement group is allocated a common time interval within which to transmit its device acknowledgement message, the base station acknowledgement message further indicating a period within the common time interval during which the wireless communication device is to transmit a device acknowledgment message;
determining the period within the common time interval from the base station acknowledgment message; and
transmitting the device acknowledgement message within the period.

19. The method of claim 18, wherein determining the period comprises determining a portion of the base station acknowledgement message that is directed to the wireless communication device and not to others of the plural wireless communication devices.

20. The method of claim 18, wherein the base station acknowledgement message comprises a list of addresses of the plural wireless communication devices addressed by the base station acknowledgement message, and wherein determining the period comprises determining a relative position within the list of addresses of an address of the wireless communication device, wherein the period is determined based on the relative position.

21. The method of claim 20, wherein an address of the wireless communication device in the list of addresses is a Temporary Flow Identifier (TFI).

22. The method of claim 18, wherein the base station acknowledgement message comprises ACK/NACK information for each of the plural wireless communication devices.

23. The method of claim 18, wherein the common time interval is a relative reserved block period and the period comprises one or more frames.

24. The method of claim 18, wherein determining the period comprises determining the period as at least one frame within the common time interval allocated to the wireless communication device based on a relative position of an address of the wireless communication device within a list of addresses relative to positions of addresses of other wireless communication devices that are members of the acknowledgement group of which the wireless communication device is a member.

25. The method of claim 18, wherein the base station acknowledgement message indicates a first time interval during which the base station acknowledgement message was transmitted and a second time interval associated with all of the plural devices, and wherein determining the period is based on the first time interval and the second time interval.

26. The method of claim 18, wherein the first time interval is a first frame of a radio block comprising the base station acknowledgement message, and wherein the second time interval is a base relative reserved block period.

27. The method of claim 18, wherein determining the period comprises determining a number of frames used for the device acknowledgement message by one or more other wireless communication devices addressed by the base station acknowledgement message.

28. A method for transmitting a device acknowledgement from a wireless communication device, comprising:
means for transmitting a radio link control message to a base station;
means for receiving a base station acknowledgement message from the base station addressed to an acknowledgment group comprising plural wireless communication devices, wherein the base station acknowledgement message is received in response to the radio link control message transmitted from the wireless communication device, the base station acknowledgement message indicating, for each of the plural wireless communication devices, whether all of a plurality of radio link control messages associated with each wireless communication device have been successfully received at the base station, wherein each wireless communication device of the acknowledgement group is allocated a common time interval within which to transmit its device acknowledgement message, the base station acknowledgement message further indicating a period within the common time interval during which the wireless communication device is to transmit a device acknowledgment message;
means for determining the period within the common time interval from the base station acknowledgment message; and
means for transmitting the device acknowledgement message within the period.

29. The wireless communication device of claim 28, wherein the means for determining the period comprises means for determining a portion of the base station acknowledgement message that is directed to the wireless communication device and not to others of the plural wireless communication devices.

30. The wireless communication device of claim 28, wherein the base station acknowledgement message comprises a list of addresses of the plural wireless communication devices addressed by the base station acknowledgement message, and wherein the means for determining the period comprise means for determining a relative position within the list of addresses of an address of the wireless communication device, wherein the period is determined based on the relative position.

31. The wireless communication device of claim 30, wherein the address of the wireless communication device in the list of addresses is a Temporary Flow Identifier (TFI).

32. The wireless communication device of claim 28, wherein the base station acknowledgement message comprises ACK/NACK information for each of the plural wireless communication devices.

33. The apparatus of claim 28, wherein the common time interval is a relative reserved block period and the period comprises one or more frames.

34. The apparatus of claim 28, wherein the means for determining the period comprise means for determining the period as at least one frame within the common time interval allocated to the wireless communication device based on a relative position of an address of the wireless communication device within a list of addresses of the plural wireless communication devices relative to positions of addresses of other wireless communication devices that are members of the acknowledgement group.

35. The apparatus of claim 28, wherein the base station acknowledgement message indicates a first time interval during which the base station acknowledgement message was transmitted and a second time interval associated with all of the plural devices, and wherein the determining of the period is based on the first time interval and the second time interval.

36. The apparatus of claim 35 wherein the first time interval is a first frame of a radio block comprising the base station acknowledgement message, and wherein the second time interval is a base relative reserved block period.

37. The apparatus of claim 28, wherein the means for determining the period comprises means for determining a number of frames used for the device acknowledgement message by one or more other wireless communication devices addressed by the base station acknowledgement message.

38. A computer-program product for transmitting acknowledgements from a wireless communication device, the computer-program product comprising a non-transitory computer readable medium having instructions thereon, the instructions comprising:
   code for causing the wireless communication device to transmit a radio link control message to a base station;
   code for causing the wireless communication device to receive a base station acknowledgement message from the base station addressed to an acknowledgment group comprising plural wireless communication devices, wherein the base station acknowledgement message is received in response to the radio link control message transmitted from the wireless communication device, the base station acknowledgement message indicating, for each of the plural wireless communication devices, whether all of a plurality of radio link control messages associated with each wireless communication device have been successfully received at the base station, wherein each wireless communication device of the acknowledgement group is allocated a common time interval within which to transmit its device acknowledgement message, the base station acknowledgement message further indicating a period within the common time interval during which the wireless communication device is to transmit a device acknowledgment message;
   code for causing the wireless communication device to determine the period within the common time interval from the base station acknowledgment message; and
   code for causing the wireless communication device to transmit the device acknowledgement message within the period.

39. A method for transmitting acknowledgements to multiple wireless communication devices, comprising:
   receiving one or more radio link control messages from multiple wireless communication devices at a base station;
   generating a single acknowledgement message after receiving the one or more radio link control messages, wherein the single acknowledgement message allows the base station to address the multiple wireless communication devices; and
   sending the single acknowledgement message to an acknowledgement group that comprises the multiple wireless communication devices, wherein the single acknowledgement message allocates a period within a common time interval during which each wireless communication device of the acknowledgement group is to transmit a device acknowledgment message, the single acknowledgement message further indicating, for each wireless communication device of the acknowledgement group, whether all of a plurality of radio link control messages associated with each wireless communication device have been successfully received at the base station; and
   receiving from each wireless communication device of the acknowledgement group device acknowledgement messages each transmitted within the period of the common time interval indicated for each wireless communication device to transmit its device acknowledgement message.

40. The method of claim 39, wherein the single acknowledgment message comprises, for each of the multiple wireless communication devices, an acknowledgment indicating that all of a plurality of radio link control data messages associated with each wireless communication device have been successfully received, or a variable length acknowledgment bit map indicating which radio link control data messages associated with each wireless communication device were not successfully received.

41. The method of claim 39, wherein the single acknowledgement message comprises a Temporary Flow Identity for each wireless communication device.

42. The method of claim 39, wherein the single acknowledgement message comprises a relative reserved block period for an addressed wireless communication device.

43. The method of claim 39, wherein the single acknowledgement message is a packet uplink ACK/NACK.

44. The method of claim 42, wherein a presence of relative reserved block period information within the single acknowledgement message implies that the wireless communication device addressed by a corresponding Temporary Flow Identity is polled for packet control acknowledgement.

45. The method of claim 44, wherein an Enhanced General Packet Radio Service Supplementary/Polling (ES/P) field in a header of the single acknowledgement message is not used.

46. The method of claim 39, wherein the single acknowledgement message comprises a variable length acknowledgement bit map for each wireless communication device that is not receiving a final acknowledgement.

47. The method of claim 39, wherein the single acknowledgement message comprises a combination of final acknowledgements for some wireless communication devices and variable length acknowledgement bit maps for other wireless communication devices.

48. The method of claim 39, wherein a number of relative reserved block period bits is extended beyond two bits.

49. The method of claim 39, wherein the method is performed by a base station.

50. The method of claim 39, further comprising determining whether the received one or more radio link control messages for each wireless communication device comprise all radio link control messages sent by the wireless communication device.

51. A method for receiving an acknowledgement by a wireless communication device, comprising:
   sending one or more radio link control messages to a base station, the wireless communication device being one of a plurality of wireless communication devices each sending respective radio link control messages to the base station;
   receiving an acknowledgement message, after sending the one or more radio link control messages, addressed to an acknowledgement group comprising the multiple wireless communication devices from the base station, wherein each wireless communication device of the acknowledgement group is allocated a common time interval within which to transmit its device acknowledgment message, the acknowledgement message further indicating a period within the common time interval during which the wireless communication device is to transmit a device acknowledgment message, the acknowledgement message further indicating, for each wireless communication device of the acknowledgement group, whether all of a plurality of radio link control messages associated with each wireless communication device have been successfully received at a base station; and determining a portion of the acknowledgement message that corresponds to the wireless communication device; and transmitting a device acknowledgement message from said device acknowledgement messages of the acknowledgement group, each transmitted within the period of the common time interval indicated for each wireless communication device to transmit its device acknowledgement message.

52. The method of claim 51, further comprising determining whether the portion of the acknowledgement message that corresponds to the wireless communication device is a final acknowledgement or a variable length acknowledgement bit map.

53. The method of claim 52, wherein the portion of the acknowledgement message that corresponds to the wireless communication device is a final acknowledgement, and wherein the wireless communication device is aware that the base station has successfully received radio link control messages sent by the wireless communication device to the base station.

54. The method of claim 52, wherein the portion of the acknowledgement message that corresponds to the wireless communication device is a variable length acknowledgement bit map, and further comprising determining one or more radio link control messages to resend to the base station.

55. The method of claim 54, further comprising sending the determined one or more radio link control messages to the base station.

56. The method of claim 51, wherein the acknowledgment message comprises, for each of the wireless communication devices, an acknowledgment indicating that all of a plurality of radio link control data messages associated with each wireless communication device have been successfully received, or a variable length acknowledgment bit map indicating which radio link control data messages associated with each wireless communication device were not successfully received.

57. The method of claim 51, wherein the acknowledgement message comprises a Temporary Flow Identity for each wireless communication device.

58. The method of claim 51, wherein the acknowledgement message comprises a relative reserved block period for a wireless communication device addressed by the base station.

59. The method of claim 51, wherein the acknowledgement message is a packet uplink ACK/NACK.

60. An apparatus for transmitting acknowledgements to multiple wireless communication devices, comprising:
a processor;
memory in electronic communication with the processor;
instructions stored in the memory, the instructions being executable by the processor to:
receive one or more radio link control messages from multiple wireless communication devices at a base station;
generate a single acknowledgement message after receiving the one or more radio link control messages, wherein the single acknowledgement message allows the base station to address the multiple wireless communication devices; and
send the single acknowledgement message to an acknowledgement group that comprises the multiple wireless communication devices, wherein the single acknowledgement message allocates a period within a common time interval during which each wireless communication device of the acknowledgement group is to transmit a device acknowledgment message, the single acknowledgement message further indicating, for each wireless communication device of the acknowledgement group, whether all of a plurality of radio link control messages associated with each wireless communication device have been successfully received at the base station; and
receiving from each wireless communication device of the acknowledgement group device acknowledgement messages each transmitted within the period of the common time interval indicated for each wireless communication device to transmit its device acknowledgement message.

61. An apparatus for receiving acknowledgements from a base station, comprising:
a processor;
memory in electronic communication with the processor;
instructions stored in the memory, the instructions being executable by the processor to:
send one or more radio link control messages to a base station, the wireless communication device being one of a plurality of wireless communication devices each sending respective radio link control messages to the base station;
receive an acknowledgement message, after sending the one or more radio link control messages, addressed to an acknowledgement group comprising the multiple wireless communication devices from the base station, wherein each wireless communication device of the acknowledgement group is allocated a common time interval within which to transmit its device acknowledgment message, the acknowledgement message further indicating a period within the common time interval during which the wireless communication device is to transmit a device acknowledgment message, the acknowledgement message further indicating, for each wireless communication device of the acknowledgement group, whether all of a plurality of radio link control messages associated with each wireless communication device have been successfully received at a base station; and
determine a portion of the acknowledgement message that corresponds to the wireless communication device; and
transmitting a device acknowledgement message from said device acknowledgement messages of the acknowledgement group, each transmitted within the period of the common time interval indicated for each wireless communication device to transmit its device acknowledgement message.

62. A wireless device for transmitting acknowledgements to multiple wireless communication devices, comprising:
means for receiving one or more radio link control messages from multiple wireless communication devices at a base station;
means for generating a single acknowledgement message after receiving the one or more radio link control messages, wherein the single acknowledgement message allows the base station to address the multiple wireless communication devices; and
means for sending the single acknowledgement message to an acknowledgement group that comprises the multiple wireless communication devices, wherein the single acknowledgement message allocates a period within a common time interval during which each wireless communication device of the acknowledgement group is to transmit a device acknowledgment message, the single acknowledgement message further indicating, for each wireless communication device of the acknowledgement group, whether all of a plurality of radio link control messages associated with each wireless communication device have been successfully received at the base station; and receiving from each wireless communication device of the acknowledgement group device acknowledgement messages each transmitted within the period of the common time interval indicated for each wireless communication device to transmit its device acknowledgement message.

63. A wireless device for receiving acknowledgements from a base station, comprising:

means for sending one or more radio link control messages to a base station, the wireless communication device being one of a plurality of wireless communication devices each sending respective radio link control messages to the base station;

means for receiving an acknowledgement message, after sending the one or more radio link control messages, addressed to an acknowledgement group comprising the multiple wireless communication devices from the base station, wherein each wireless communication device of the acknowledgement group is allocated a common time interval within which to transmit its device acknowledgment message, the acknowledgement message further indicating a period within the common time interval during which the wireless communication device is transmit transmits a device acknowledgment message, the acknowledgement message further indicating, for each wireless communication device of the acknowledgement group, whether all of a plurality of radio link control messages associated with each wireless communication device have been successfully received at a base station;

means for determining a portion of the acknowledgement message that corresponds to the wireless communication device; and means for transmitting a device acknowledgement message from said device acknowledgement messages of the acknowledgement group, each transmitted within the period of the common time interval indicated for each wireless communication device to transmit its device acknowledgement message.

64. A computer-program product for transmitting acknowledgements to multiple wireless communication devices, the computer-program product comprising a non-transitory computer-readable medium having instructions thereon, the instructions comprising:

code for receiving one or more radio link control messages from multiple wireless communication devices at a base station;

code for generating a single acknowledgement message after receiving the one or more radio link control messages, wherein the single acknowledgement message allows the base station to address the multiple wireless communication devices; and code for sending the single acknowledgement message to an acknowledgement group that comprises the multiple wireless communication devices, wherein the single acknowledgement message allocates a period within a common time interval during which each wireless communication device of the acknowledgement group is to transmit a device acknowledgment message, the single acknowledgement message further indicating, for each wireless communication device of the acknowledgement group, whether all of a plurality of radio link control messages associated with each wireless communication device have been successfully received at the base station; and receiving from each wireless communication device of the acknowledgement group device acknowledgement messages each transmitted within the period of the common time interval indicated for each wireless communication device to transmit its device acknowledgement message.

65. A computer-program product for receiving acknowledgements from a base station, the computer-program product comprising a nontransitory computer-readable medium having instructions thereon, the instructions comprising:

code for causing a wireless communication device to send one or more radio link control messages to a base station, the wireless communication device being one of a plurality of wireless communication devices each sending respective radio link control messages to the base station;

code for causing the wireless communication device to receive an acknowledgement message, after sending the one or more radio link control messages, addressed to an acknowledgement group comprising the multiple wireless communication devices from the base station, wherein each wireless communication device of the acknowledgement group is allocated a common time interval within which to transmit its device acknowledgment message, the acknowledgement message further indicating a period within the common time interval during which the wireless communication device is transmit a device acknowledgment message, the acknowledgement message further indicating, for each wireless communication device of the acknowledgement group, whether all of a plurality of radio link control messages associated with each wireless communication device have been successfully received at a base station; and code for causing the wireless communication device to determine a portion of the acknowledgement message that corresponds to the wireless communication device; and code for causing the wireless communication device to transmit a device acknowledgement message from said device acknowledgement messages of the acknowledgement group, each transmitted within the period of the common time interval indicated for each wireless communication device to transmit its device acknowledgement message.

* * * * *